(12) United States Patent
Bhave et al.

(10) Patent No.: US 10,621,221 B2
(45) Date of Patent: Apr. 14, 2020

(54) SYSTEM FOR ORGANIZING AND FAST SEARCHING OF MASSIVE AMOUNTS OF DATA

(71) Applicants: CUMULUS SYSTEMS INC., Campbell, CA (US); Ajit Bhave, Palo Alto, CA (US); Arun Ramachandran, Palo Alto, CA (US); Sai Krishnam Nadimpalli, Bangalore (IN); Sandeep Bele, Cinchwadgaon, Pune (IN)

(72) Inventors: Ajit Bhave, Palo Alto, CA (US); Arun Ramachandran, Cupertino, CA (US); Sai Krishnam Raju Nadimpalli, Bangalore (IN); Sandeep Bele, Pune (IN)

(73) Assignee: CUMULUS SYSTEMS INC., Campbell, CA (US)

( * ) Notice: Subject to any disclaimer, the term of this patent is extended or adjusted under 35 U.S.C. 154(b) by 0 days.

(21) Appl. No.: 16/024,590

(22) Filed: Jun. 29, 2018

(65) Prior Publication Data
US 2018/0316579 A1    Nov. 1, 2018

Related U.S. Application Data

(62) Division of application No. 15/376,629, filed on Dec. 12, 2016, now Pat. No. 10,044,575, which is a (Continued)

(51) Int. Cl.
*G06F 16/36* (2019.01)
*G06F 21/55* (2013.01)
(Continued)

(52) U.S. Cl.
CPC ......... *G06F 16/36* (2019.01); *G05B 23/0272* (2013.01); *G06F 11/3006* (2013.01); (Continued)

(58) Field of Classification Search
CPC ... H04L 43/022; H04L 69/329; H04L 67/025; H04L 67/42; H04L 43/14; H04L 12/4625; (Continued)

(56) References Cited

U.S. PATENT DOCUMENTS 5,172,228 A    12/1992  Israelson
5,179,378 A     1/1993  Ranganathan
(Continued)

*Primary Examiner* — Chris Parry
*Assistant Examiner* — Weiwei Y Stiltner
(74) *Attorney, Agent, or Firm* — Ron Fish

(57) ABSTRACT

A system to collect and store in a special data structure arranged for rapid searching massive amounts of data. Performance metric data is one example. The performance metric data is recorded in time-series measurements, converted into unicode, and arranged into a special data structure having one directory for every day which stores all the metric data collected that day. The performance metric data is collected by one or more probes running on machines about which data is being collected. The performance metric data is compressed prior to transmission to a server over any data path. The data structure at the server where analysis is done has a subdirectory for every resource type. Each subdirectory contains text files of performance metric data values measured for attributes in a group of attributes to which said text file is dedicated. Each attribute has its own section and the performance metric data values are recorded in time series as unicode hex numbers as a comma delimited list. Analysis of the performance metric data is done using regular expressions. For speed, cache memory is used. Performance metric data outside the start time and end time named by the user on a query screen is eliminated before the regular expression is applied.

12 Claims, 11 Drawing Sheets

Related U.S. Application Data division of application No. 13/200,996, filed on Oct. 5, 2011, now abandoned.

(51) Int. Cl.

| | | |
|---|---|---|
| G06F 17/27 | (2006.01) | |
| G06F 16/43 | (2019.01) | |
| G06F 16/84 | (2019.01) | |
| G06F 16/14 | (2019.01) | |
| G06F 16/185 | (2019.01) | |
| G06F 16/245 | (2019.01) | |
| G06F 16/25 | (2019.01) | |
| G06F 16/28 | (2019.01) | |
| G06F 16/33 | (2019.01) | |
| G06F 16/335 | (2019.01) | |
| G06F 16/951 | (2019.01) | |
| G06F 16/242 | (2019.01) | |
| G06F 16/2452 | (2019.01) | |
| G06F 16/2453 | (2019.01) | |
| G06F 16/2455 | (2019.01) | |
| G06F 16/2458 | (2019.01) | |
| G06F 16/901 | (2019.01) | |
| G06F 16/9032 | (2019.01) | |
| G06F 16/9535 | (2019.01) | |
| G06F 16/903 | (2019.01) | |
| G05B 23/02 | (2006.01) | |
| G06F 11/34 | (2006.01) | |
| G06F 11/30 | (2006.01) | |
| H04L 12/26 | (2006.01) | |
| H04L 12/46 | (2006.01) | |
| H04L 29/08 | (2006.01) | |
| H04L 29/06 | (2006.01) | |
| G06F 16/332 | (2019.01) | |
| G06F 16/338 | (2019.01) | |
| G06F 16/383 | (2019.01) | |
| G06F 16/31 | (2019.01) | |
| G06F 16/248 | (2019.01) | |
| G06F 17/22 | (2006.01) | |

(52) U.S. Cl.
CPC ...... *G06F 11/3072* (2013.01); *G06F 11/3082* (2013.01); *G06F 11/3409* (2013.01); *G06F 11/3476* (2013.01); *G06F 16/148* (2019.01); *G06F 16/185* (2019.01); *G06F 16/245* (2019.01); *G06F 16/2423* (2019.01); *G06F 16/2452* (2019.01); *G06F 16/2453* (2019.01); *G06F 16/2455* (2019.01); *G06F 16/2468* (2019.01); *G06F 16/2477* (2019.01); *G06F 16/24522* (2019.01); *G06F 16/258* (2019.01); *G06F 16/283* (2019.01); *G06F 16/284* (2019.01); *G06F 16/31* (2019.01); *G06F 16/334* (2019.01); *G06F 16/335* (2019.01); *G06F 16/338* (2019.01); *G06F 16/3329* (2019.01); *G06F 16/3331* (2019.01); *G06F 16/3337* (2019.01); *G06F 16/383* (2019.01); *G06F 16/43* (2019.01); *G06F 16/86* (2019.01); *G06F 16/9024* (2019.01); *G06F 16/9032* (2019.01); *G06F 16/90335* (2019.01); *G06F 16/90344* (2019.01); *G06F 16/951* (2019.01); *G06F 16/9535* (2019.01); *G06F 17/2705* (2013.01); *G06F 21/552* (2013.01); *H04L 12/4625* (2013.01); *H04L 29/06* (2013.01); *H04L 29/06047* (2013.01); *H04L 29/08072* (2013.01); *H04L 29/08099* (2013.01); *H04L 43/022* (2013.01); *H04L 43/04* (2013.01); *H04L 43/12* (2013.01); *H04L 43/14* (2013.01); *H04L 67/025* (2013.01); *H04L 67/42* (2013.01); *H04L 69/329* (2013.01); *G06F 16/248* (2019.01); *G06F 17/2217* (2013.01); *G06F 17/2252* (2013.01); *G06F 2216/03* (2013.01)

(58) Field of Classification Search
CPC .............. H04L 43/12; H04L 29/08099; H04L 29/06047; H04L 29/08072; H04L 29/06; H04L 43/04; G05B 23/0272; G06F 16/36; G06F 16/31; G06F 16/3329; G06F 16/338; G06F 16/383; G06F 16/90335; G06F 16/24522; G06F 16/9535; G06F 16/9032; G06F 16/9024; G06F 16/3337; G06F 16/3331; G06F 16/2477; 16/2468; G06F 16/2455; G06F 16/2453; G06F 16/2452; G06F 16/2423; G06F 16/951; G06F 16/335; G06F 16/334; G06F 16/284; G06F 16/283; G06F 16/258; G06F 16/245; G06F 16/185; G06F 16/148; G06F 16/86; G06F 16/43; G06F 16/90344; G06F 11/3082; G06F 11/3006; G06F 17/2705; G06F 21/552; G06F 11/3476; G06F 11/3409; G06F 11/3072; G06F 16/248; G06F 2216/03; G06F 17/2252; G06F 17/2217
USPC ....................................... 709/224
See application file for complete search history.

(56) References Cited

U.S. PATENT DOCUMENTS

| | | | |
|---|---|---|---|
| 5,613,113 A | 3/1997 | Goldring | |
| 5,668,928 A | 9/1997 | Groner | |
| 6,128,628 A | 10/2000 | Walclawski | |
| 6,384,279 B1 | 5/2002 | Faulkner | |
| 6,389,427 B1 | 5/2002 | Faulkner | |
| 6,598,078 B1 | 7/2003 | Ehrlich | |
| 6,643,653 B1 | 11/2003 | Chu | |
| 6,658,487 B1 | 12/2003 | Smith | |
| 6,737,994 B2 | 5/2004 | Davis et al. | |
| 6,763,347 B1 | 7/2004 | Zhang | |
| 7,340,477 B1 | 3/2008 | Tolbert | |
| 7,343,604 B2 | 3/2008 | Grabarnick | |
| 7,890,548 B2 * | 2/2011 | Sengupta | G06F 17/227 707/790 |
| 8,112,425 B2 | 2/2012 | Baum | |
| 8,214,439 B2 | 7/2012 | Hwang | |
| 8,386,633 B2 | 2/2013 | Smith | |
| 8,522,192 B1 | 8/2013 | Avalos | |
| 8,892,540 B2 | 11/2014 | Walker | |
| 8,965,719 B1 | 2/2015 | Ippolito | |
| 2001/0044751 A1 | 11/2001 | Pugliese | |
| 2003/0046257 A1 | 3/2003 | Atkins | |
| 2003/0182103 A1 | 9/2003 | Atkin | |
| 2003/0212696 A1 | 11/2003 | Davis | |
| 2004/0034521 A1 | 4/2004 | Kawakura | |
| 2004/0215647 A1 | 10/2004 | Farn | |
| 2004/0243607 A1 | 12/2004 | Tummalapalli | |
| 2005/0022207 A1 | 1/2005 | Grabarnik | |
| 2005/0044064 A1 | 2/2005 | Haase | |
| 2005/0049997 A1 | 3/2005 | Shipp | |
| 2005/0076067 A1 | 4/2005 | Bakalash | |
| 2005/0160110 A1 | 7/2005 | Charlet | |
| 2005/0228906 A1 | 10/2005 | Kubota | |
| 2005/0278703 A1 | 12/2005 | Lo | |
| 2006/0184874 A1 | 8/2006 | Kimiya | |
| 2006/0200452 A1 | 9/2006 | Lee | |
| 2006/0218450 A1 | 9/2006 | Malik | |
| 2007/0113031 A1 | 5/2007 | Brown | |
| 2007/0143309 A1 | 6/2007 | Malik | |
| 2007/0226204 A1 | 9/2007 | Feldman | |
| 2007/0226554 A1 | 9/2007 | Greaves | |

(56) References Cited

U.S. PATENT DOCUMENTS

| | | |
|---|---|---|
| 2008/0034441 A1 | 2/2008 | Saha |
| 2008/0098454 A1 | 4/2008 | Toh |
| 2008/0165747 A1 | 7/2008 | Budka |
| 2008/0177766 A1 | 7/2008 | Park |
| 2008/0225738 A1 | 9/2008 | Virohabriswaran |
| 2008/0256070 A1 | 10/2008 | Ingus |
| 2008/0288599 A1 | 11/2008 | Kutchmark |
| 2009/0187601 A1 | 7/2009 | Sengupta |
| 2009/0199160 A1 | 8/2009 | Vaitheeswaran |
| 2009/0199196 A1 | 8/2009 | Peracha |
| 2010/0082531 A1 | 4/2010 | Sakamoto |
| 2010/0121869 A1 | 5/2010 | Biannic |
| 2010/0274801 A1 | 5/2010 | Biannic |
| 2010/0146269 A1 | 6/2010 | Ambuselvan |
| 2010/0146291 A1 | 6/2010 | Anbuselvan |
| 2010/0174718 A1 | 7/2010 | Chen |
| 2010/0274810 A1 | 10/2010 | Walker |
| 2010/0325132 A1* | 12/2010 | Liu .................. G06F 16/24568 707/759 |
| 2011/0037625 A1 | 2/2011 | Joyce |
| 2011/0128169 A1 | 6/2011 | Schneider |
| 2011/0145891 A1 | 6/2011 | Bade |
| 2011/0153361 A1 | 6/2011 | Torres |
| 2011/0153616 A1 | 6/2011 | Torres |
| 2011/0225562 A1 | 9/2011 | Bura |
| 2012/0023117 A1 | 1/2012 | Butt |
| 2012/0096558 A1 | 4/2012 | Evrard |
| 2012/0143912 A1 | 6/2012 | Horton |
| 2012/0254224 A1 | 10/2012 | Thompson |
| 2012/0270505 A1 | 10/2012 | Prakash |
| 2012/0284369 A1 | 11/2012 | Fishgait |
| 2013/0036265 A1 | 2/2013 | Bert |
| 2013/0073576 A1 | 3/2013 | Lillethun |
| 2014/0289702 A1 | 9/2014 | McMahon |
| 2015/0199414 A1 | 6/2015 | Braginsky |

* cited by examiner

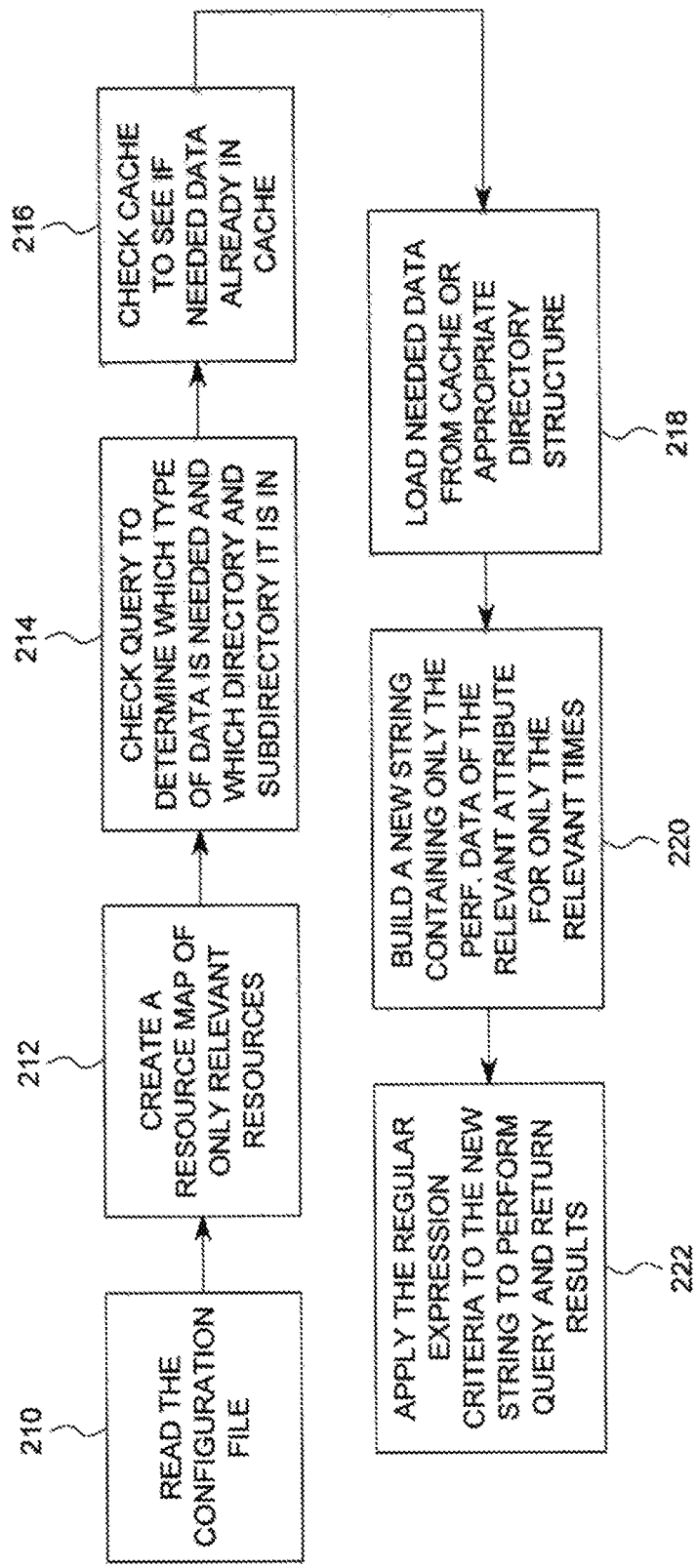

SYSTEM FOR ORGANIZING AND FAST SEARCHING OF MASSIVE AMOUNTS OF DATA

BACKGROUND OF THE INVENTION

In the management of IT systems and other systems where large amounts of performance data is generated, there is a need to be able to gather, organize and store large amounts of performance data and rapidly search it to evaluate management issues. For example, server virtualization systems have many virtual servers running simultaneously. Management of these virtual servers is challenging since tools to gather, organize, store and analyze data about them are not well adapted to the task.

One prior art method for remote monitoring of servers, be they virtual servers or otherwise, is to establish a virtual private network between the remote machine and the server to be monitored. The remote machine to be used for monitoring can then connect to the monitored server and observe performance data. The advantage to this method is that no change to the monitored server hardware or software is necessary. The disadvantage of this method is the need for a reliable high bandwidth connection over which the virtual private network sends its data. If the monitored server runs software which generates rich graphics, the bandwidth requirements go up. This can be a problem and expensive especially where the monitored server is overseas in a data center in, for example, India or China, and the monitoring computer is in the U.S. or elsewhere far away from the server being monitored.

Another method of monitoring a remote server's performance is to put an agent program on which gathers performance data and forward the gathered data to the remote monitoring server. This method also suffers from the need for a high bandwidth data link between the monitored and monitoring servers. This high bandwidth requirement means that the number of remote servers that can be supported and monitored is a smaller number. Scalability is also an issue.

Other non IT systems generate large amount of data that needs to be gathered, organized, stored and searched in order to evaluate various issues. For example, a bridge may have thousands of stress and strain sensors attached to it which are generating stress and strain readings constantly. Evaluation of these readings by engineers is important to managing safety issues and in designing new bridges or retrofitting existing bridges.

Once performance data has been gathered, if there is a huge volume of it, analyzing it for patterns is a problem. Prior art systems such as performance tools and event log tools use relational databases (tables to store data that is matched by common characteristics found in the dataset) to store the gathered data. These are data warehousing techniques. SQL queries are used to search the tables of time-series performance data in the relational database.

Several limitations result from using relational databases and SQL queries. First, there is a ripple that affects all the other rows of existing data as new indexes are computed. Another disadvantage is the amount of storage that is required to store performance metric data gathered by the minute regarding multiple attributes of one or more servers or other resources. Storing performance data in a relational database engenders an overhead cost not only in time but also money in both storing it and storing it in an indexed way so that it can be searched since large commercial databases can be required if the amount of data to be stored is large.

Furthermore, SQL queries are efficient when joining rows across tables using key columns from the tables. But SQL queries are not good when the need is to check for patterns in values of columns in a series of adjacent rows. This requires custom programming in the form of "stored procedures" which extract the desired information programmatically. This is burdensome, time consuming and expensive to have to write a custom program each time a search for a pattern is needed. As the pattern being searched for becomes more complex, the complexity of the stored procedure program also becomes more complex.

The other way of searching for a pattern requires joining the table with itself M−1 number of times and using a complex join clause. This becomes impractical as the number of joins exceeds 2 or 3.

As noted earlier, the problems compound as the amount of performance data becomes large. This can happen when, for example, receiving performance data every minute from a high number of sensors or from a large number of agents monitoring different performance characteristics of numerous monitored servers. The dataset can also become very large when, for example, there is a need to store several years of data. Large amounts of data require expensive, complex, powerful commercial databases such as Oracle.

There is at least one prior art method for doing analysis of performance metric data that does not use databases. It is popularized by the technology called Hadoop. In this prior art method, the data is stored in file systems and manipulated. The primary goal of Hadoop based algorithms is to partition the data set so that the data values can be processed independent of each other potentially on different machines thereby bring scalability to the approach. Hadoop technique references are ambiguous about the actual processes that are used to process the data.

Therefore, a need has arisen for an apparatus and method to reduce the amount of performance data that is gathered so that more sensors or servers can be remotely monitored with a data link of a given bandwidth. There is also a need to organize and store the data without using a relational database and to be able to search the data for patterns without having to write stored procedure programs, or do table joins and write complex join clauses.

BRIEF DESCRIPTION OF THE DRAWINGS

FIG. 6 is a template for a regular expression used to explain the syntax of a typical regular expression query.

FIG. 7 is a flowchart of one embodiment of the Query Request Handler module.

DETAILED DESCRIPTION OF THE VARIOUS EMBODIMENTS

Figure 1:
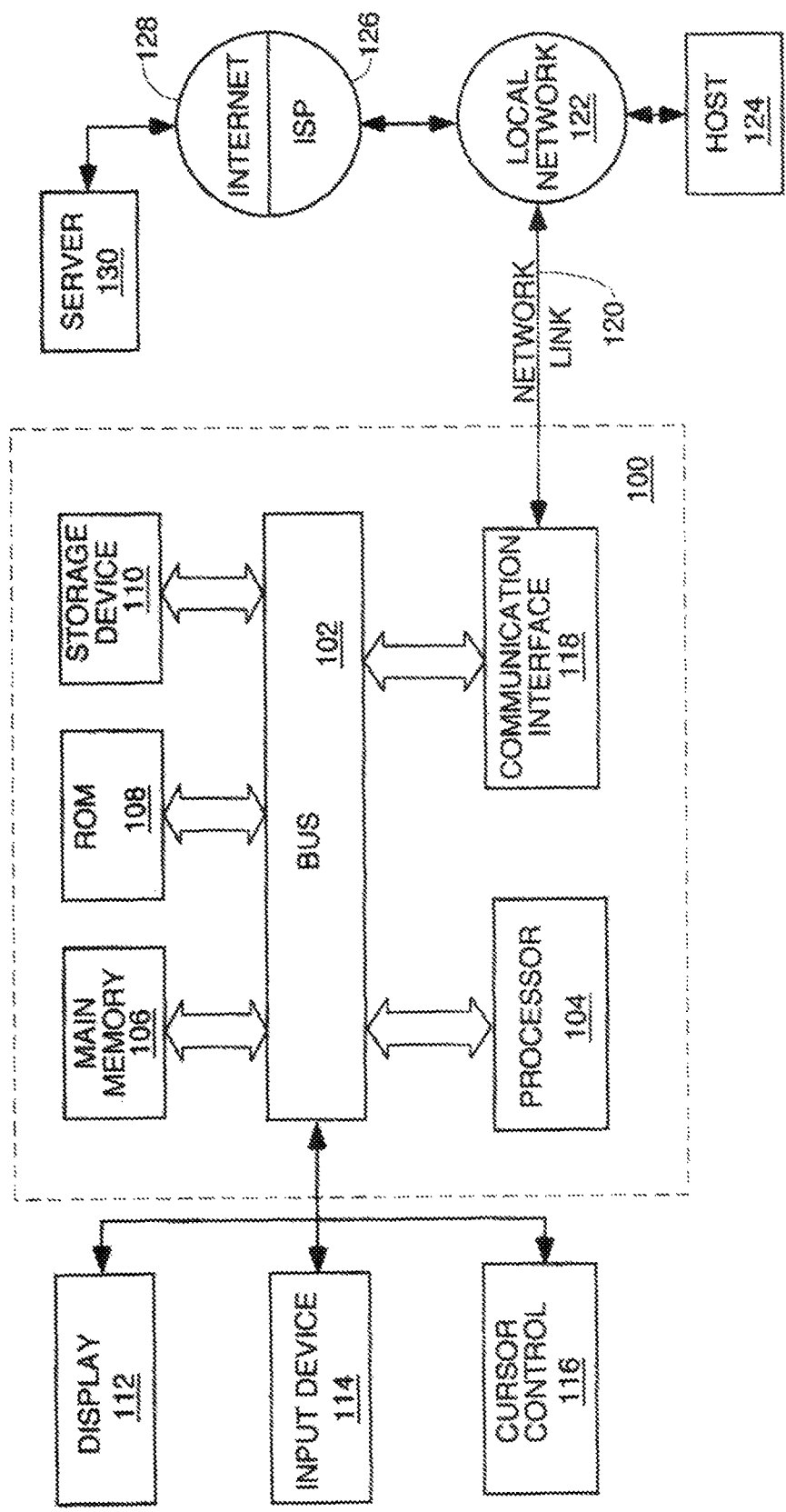
FIG. 1 is a block diagram of a typical server on which the processes described herein for organizing, storing and searching performance data can run.

There is disclosed herein apparatus and processes for infrastructure performance data analysis (and analysis of other large amounts of performance data) which uses search techniques instead of relational databases to store and organize data. Data is stored in a special folder and directory structure with one directory for every day's worth of data. This allows data to be collected, processed and stored at a faster rate. Performance data is stored in a file system having one directory for each day. All the performance data collected from one or more resources in an IT environment or one or more sensors in some other environment on the day corresponding to the directory is stored in files within the directory. There is a subdirectory for each resource where the directory name is the signature for that resource. There is one file for a group of attributes. Each attribute file has N sections, one for each attribute defined to be in the group. Each section has M values, where M values comprise the entire times series of values for that attribute for the entire day corresponding to the resource.

The result is that all the collected performance data is stored as patterns; the patterns being data from many sources which are sorted and stored in a time series in the special directory structure described above; so all data from all sources for a particular day is stored in one directory structure. This data structure allows the data set to be searched with time as one axis and each data element as the other axis.

Attribute values are stored either as band values or delta values. Each value for an attribute for a particular reading on a particular day is stored as Java UTF-8 encoded string with each value encoded a single Unicode character. In other words, the numbers of each performance metric value are converted to letters of a Java UTF-8 encoded string. This allows searching using standard regular expressions the syntax of which is known and comprises a form of formal language. The various elements of syntax can be used to construct search queries which search through the performance data for patterns. Regular expressions can only search text and not numbers and that is why the performance metric readings or values have their numbers converted to text before storage.

The syntax of regular expression is rich with tools that allow complex searches and pattern analysis simply by writing an expression of the proper syntax thereby eliminating the time consuming need to write a custom program or "stored procedure" in SQL to do the same thing in searching the data of a relational database.

Unicode is a computing industry standard for the consistent encoding, representation and handling of text expressed in most of the world's writing systems. It is a set of approximately 1 million characters that span from hex 0 to hex 10FFFF. There are enough Unicode characters to devote a single one to every symbol in the Japanese and Chinese languages and all the alphabets in the world and all the numbers in which performance metrics are expressed. Each performance metric value received from an agent is converted to one of these Unicode characters.

Searching the performance data with regular expressions defining particular patterns of data from certain resources which satisfy certain conditions expressed in the regular expressions is analogous to searching large amounts of text for keywords and reporting only those portions of the text which fit a certain semantic usage.

The performance metric data is automatically converted by the system to Unicode strings of alphabetic characters from the set of 109,000 characters in the Unicode Standard.

The use of regular expressions allows complex patterns of performance data to be searched without having to write complex, custom programs called "stored procedures" which would be necessary if a relational database was used to store the data and SQL was used to search the database.

The system of the invention allows users to draft their search queries as regular expressions. The user must know the syntax of regular expressions in order to do this unless the user wishes to only use predefined searches which some embodiments of the system of the invention provide for selection and execution by a user. A regular expression provides a concise and flexible means for matching strings of text, such as particular characters, words, or patterns of characters.

A regular expression is written in a formal language that can be interpreted by a regular expression processor, a program that either serves as a parser generator or examines text and identifies parts that match the provided specification.

Storing the Unicode characters encoding the performance metric data in the special directory structure described herein eliminates the need for use of an expensive database system such as Oracle even where very large amounts of data are collected and stored.

The performance data is collected by agent programs which are coupled to the sensors or are programmed on the IT resources being monitored. These agent programs collect, compress and send the performance data over the data link to the remote monitoring server which collects it, converts it to Unicode and stores it in the directory structure defined above. The remote monitoring server also provides an interface for a user to compose regular expression search queries and also provided "canned" searches which can be run by a user, each canned search being a predefined regular expression which the user may modify slightly to suit his or her purposes.

The process and apparatus for collecting, storing and processing performance metric data differs from SQL Database technology in at least two ways. First, the partition algorithm stored performance data based upon time slices. Data is stored in file systems sorted by time slices. A time slice represents a point in time and over time, and there are many such slices. Unlike a traditional database, this technique allows the inventors to not impact the overall database when new data for a time slice is introduced or a new time slice is created. That is, there is no ripple effect.

Figure 2:
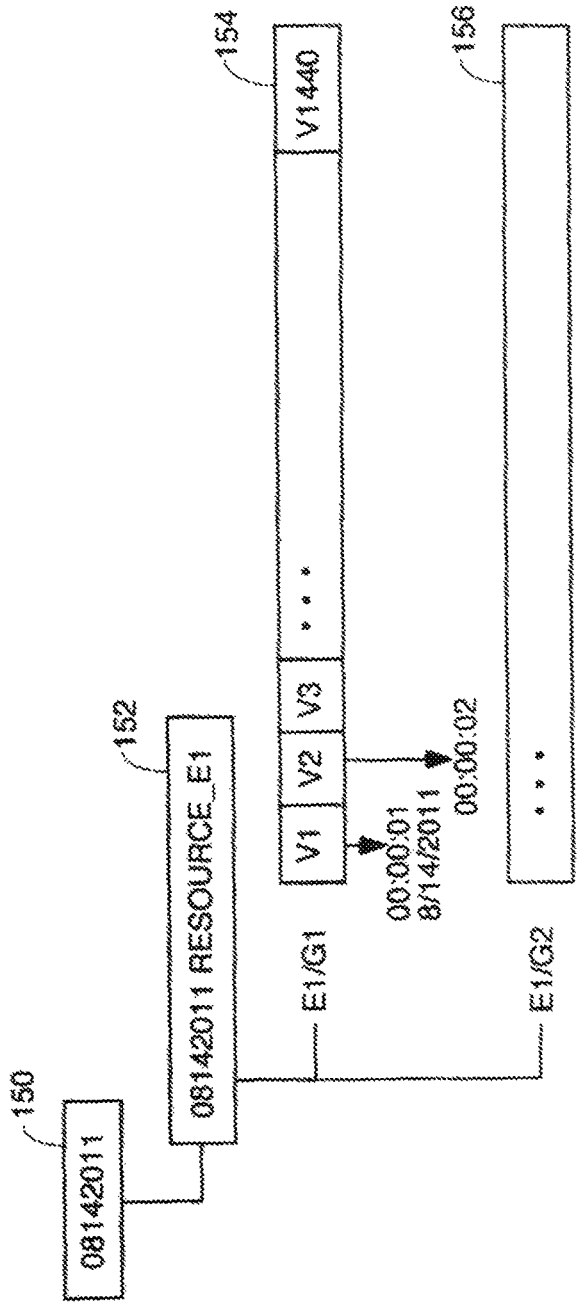
FIG. 2 is an example of a directory structure storing one day's performance data on a resource the performance of which is being monitored remotely.
Figure 3:
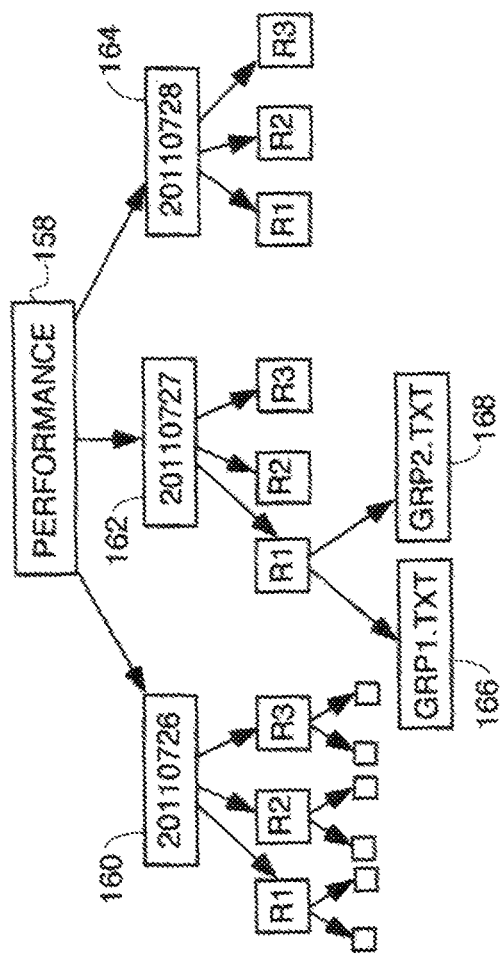
FIG. 3 is another example of a file system containing a separate directory for storing performance metric data for three different days for three different resources, each resource having two groups of attributes.

Storing the data in time slices in the special directory structure, examples of which are shown in FIGS. 2 and 3, allows the data to be searched with time as one axis and each data element as the other axis. This is analogous to searching a large amount of text for keywords and then reporting only those portions of text that fit a certain semantic usage.

The second difference is that the method of analysis and search of the performance data is based upon regular expressions which are used to search Unicode encoded text where the performance metric numbers have been converted to Unicode text characters. Regular expressions have a fixed, predefined syntax and semantics (together considered a grammar) and a variety of expressions can be formed using this syntax and semantics to search the performance data for patterns that meet criteria expressed in the regular expressions composed for the custom search. Regular expressions can be derived for all different kinds of search to limit the search to particular resources, particular attributes of those resources, particular days or particular time intervals during particular days, etc. Great flexibility is provided without the complexity and labor of having to write custom programs in the form of stored procedures to find the right data and analyze it.

The processes described here to search and analyze performance metric data are inspired by and somewhat similar to XPATH technology. XPATH is a technique used to traverse XML document data. XPATH-like techniques are used here to analyze infrastructure performance metric data and changes to that data over time. The processes described herein extend the XPATH notions to the search and analysis of data organized and stored by time slice which makes the search and analysis techniques taught herein efficient and fast. Search and analysis of the performance data is done using path-based techniques. A graph is created that represents the data. The graph G is a representation of vertex and edges (V,E). An edge connects two vertices and vertex has the ability to evaluate an expression and then, based on the expression, allow for a traversal through an appropriate edge.

FIG. 1 is a block diagram of a typical server on which the processes described herein for organizing, storing and searching performance data can run. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further usually includes a read only memory (ROM) 108 or other static storage device coupled to bus 102 for storing static information and instructions for processor 104. A storage device 110, such as a magnetic disk or optical disk, is provided and coupled to bus 102 for storing information and instructions. Usually the performance data is stored in special directory structures on storage device 110.

Computer system 100 may be coupled via bus 102 to a display 112, such as a cathode ray tube (CRT) of flat screen, for displaying information to a computer user who is analyzing the performance data. An input device 114, including alphanumeric and other keys, is coupled to bus 102 for communicating information and command selections to processor 104. Another type of user input device is cursor control 116, such as a mouse, a trackball, a touchpad or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The processes described herein to organize, store and search performance data uses computer system 100 as its hardware platform, but other computer configurations may also be used such as distributed processing. According to one embodiment, the process to receive, organize, store and search performance data is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110.

Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in supplying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on a telephone line or broadband link and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of broad band link to the internet. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 which is having its performance data monitored might transmit performance data via an agent program that collects it through Internet 128, ISP 126, local network 122 and communication interface 118 to computer system 100. The received performance data is stored and can be searched by the processes described later herein.

Figure 4:
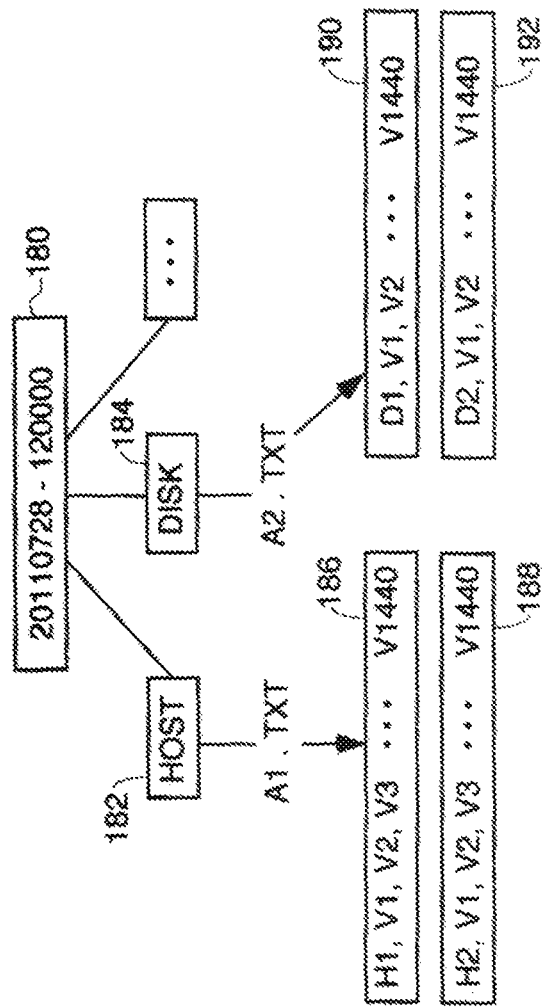
FIG. 4 is a diagram of the directory structure of an example of data collected by a probe.

The system according to the teachings of the invention has on the software and data side the following components which are executed and stored on the hardware platform described above or similar.
Data Store Manager;
Query Request Handler;
Data Access Manager;
Probe Interface; and
Proprietary non-relational database referred to as the NDRB and detailed in the Directory Structure heading below and illustrated in FIGS. 2 and 3
Data Store Manager
This component receives data from probes in a well defined format, it and stores it in NRDB. A probe is an external software program which collects data on a periodic basis from an external data source and writes data into a format which can be processed by Data Store Manager. The Data Store Manager can have any program structure so long as it can receive data in the probe data format described elsewhere herein, decompress it and store it in the NDRB in the directory structure and data format described herein for the NDRB. In the preferred embodiment, it will have a program structure which can perform the processing of the flowchart of FIG. 5. It can run on any off the shelf computer having sufficient speed, memory capacity and disk capacity to store the performance data being collected.
Query Request Handler
This component accepts search queries from external applications or users, and provides back the results. The query language is a proprietary syntax for regular expressions which is given below under the Query Definition Language Heading, and which provides constructs for specifying search patterns to analyze data. The Query Request Handler can have any program structure which can receive query requests with regular expressions embedded therein having the syntax described below, and parse those queries and perform the processing of the flowchart of FIG. 7. It can run on any off the shelf computer having sufficient speed, memory capacity and disk capacity to store the performance data being collected.
Data Access Manager
This component provides access to the data stored in Megha's proprietary non-relational database (NRDB). This internal employs standard caching techniques to provide results faster. The Data Access Manager can have any program structure which can access directory structures like those of the NDRB of which FIGS. 3 and 4 are examples, and which supports the Query Request Handler requests for data from the NDRB to perform the processing of the flowchart of FIG. 7. It can run on any off the shelf computer having sufficient speed, memory capacity and disk capacity to store the performance data being collected.
Probe Interface
NRDB
All the data in Megha is stored in NRDB. NRDB uses a normal file system consisting of files and folders. It uses a special folder structure and special encoding of data files to optimize the storage and access of data.

The entire software that implements the Data Store Manager, the Search Handler, the Data Access Manager and the Probe Interface, in the preferred embodiment is designed to run on commodity hardware inside a Java virtual machine. Commodity hardware is defined as regularly available Intel x86/64 architecture based computers. Standard Linux distribution such as CentOS is used as the base operating system.

As an example of how the system works to collect performance metric data and analyze it, suppose server 130 is a server which has a couple of virtual machines running on it the performance of which is to be monitored. The performance metric data for each virtual machine is collected by an agent or probe process (not shown) or, in some embodiments, a separate probe process for every virtual machine. The performance data is gathered on a per day basis to measure various performance metrics on server 130. Performance data of the server 130 itself such as CPU cycle utilization, hard disk access time, hard disk capacity, etc. may also be gathered. There are usually several metrics that are measured simultaneously, often on a per minute basis.

This performance metric data gathered by the agent process is compressed and packetized and the packets are sent over the internet 128 to ISP 126 to which a local area network 122 is connected. The local area network is coupled via a network line 120 to the communications interface 118 of the monitoring server system 100.
Probe Data Format
The performance metric data for every element is collected by a probe. A probe is a program running on the computer having the element or attribute being monitored. The probe for each element periodically or sporadically (usually a call is made every minute) makes application programmatic interface calls to the operating system of the computer or other machine to gather the performance data on the element it is monitoring. The probes can be any agent hardware and/or software combination that can collect the desired performance metric data and put it into the data format described below for probe data.

Probes don't have to be just for IT attributes. They can also gather data for mechanical structures or automotive systems. For example, engineers designing bridges may attach temperature and strain sensors at various positions on the structures, each of which is read by a probe program running on a computer which periodically interrogates each sensor from time to time, takes its reading and sends it elsewhere for storage and analysis. The probe gathers all the sensor data, formats the data into the data structure format described below, compresses the data structure and packetizes the compressed data for transmission over any data path to a system elsewhere for analysis. Likewise for cars, engines, etc. The probe system is more or less like the modern day equivalent of telemetry systems used on satellites and missiles that feed performance data back to an earth station by a radio telemetry link.

The performance metric data values gathered by the probes are typically packetized for transmission over the internet. The primary objective of the probe data format is to reduce the amount of data which probe will produce so as to reduce bandwidth requirements on the data link over which the probe data is sent. This reduces the amount of storage required to store the data and also makes the transmission to another location faster. The probe programs do not do the conversion of the performance metric data to Unicode in the preferred embodiment, but in some alternative embodiments, they could.

The probe collects all the attribute data for one day on all the elements it is monitoring and creates a directory structure such as the one shown in FIG. 4. The directory structure contains files which store the time series of attribute values (performance metric data) for every attribute for which the probe collected data. The attribute values are numbers and are not converted by the probe to Unicode values. That happens at the monitoring server end.

In FIG. 4, block 180 represents the top level directory, block 182 represents a folder for all host type elements, block 184 represents a folder for all disk type elements being monitored. Each of the folders 182 and 184 contains a text file that contain the attribute values obtained by the probe for every element being monitored of the type symbolized by the subdirectory. Each text file that contains all the performance metric values for all the monitored elements in the same group with one row containing the performance metric values measured for one of the elements being monitored in that group. For example, the host folder 182 may have a single text tile A1.txt, but that file contains multiple row, one for each host element being monitored. For example, blocks 186 and 188 contain the performance metric values for two particular hosts being monitored in the group within A1.txt called H1 and H2. H1 and H2 in blocks 186 and 188 represent unique strings which uniquely identify the hosts for which the performance metric data was collected. H1 has 1440 performance metric measurements stored in the row symbolized by the V1, V2 . . . V1440 values in a comma delimited list. for host H1, a performance value was measured every minute. Same for host H2. Blocks 190 and 192 contain performance metric values collected by the probe for two disks D1 and D2 in the group of monitored elements "disk" represented by folder 184. These performance metric values for disks D1 and D2 are stored in different sections or rows of a text file named A2.txt.

The whole collection of data files and subdirectories is zipped by the probe into one zip file which is a compressed version of the data structure. By sending a compressed version of the data, the bandwidth requirement on the data path between the probe and the monitoring server(s) is greatly reduced. When the zip file is unzipped, the data structure like that in FIG. 4 (or whatever the data structure is the number of elements and attributes being monitored) results.

Any payload produced by the probe must conform to the following structure:

The first file named
ListOfFiles<YYYYMMDD_HHmmSS>_<base64 encoded text of encrypted value of
(SiteName + "_"+ServerName +"_"+ ArraySerialNumber)>_<ProbeType>.txt

- Each line inside this file will have name of a file which is part of this payload
    - If the file has configuration or events data, the file must be named Conf<YYYYMMDD_HHmmSS>_<base64 encoded text of encrypted value of (SiteName + "_"+ServerName +"_"+ ArraySerialNumber)>_<ProbeType>.zip.enc
    - If the file has performance data, the file must be named Perf<YYYYMMDD_HHmmSS>_<base64 encoded text of encrypted value of (SiteName + "_"+ServerName +"_"+ ArraySerialNumber)>_<ProbeType>.zip.enc Where:
- SiteName - name of the site assigned for the probe
- ServerName - name of the entity from which data is being collected, it is the text filled in by the user during probe configuration.
- ArraySerialNumber - Optional additional information to further identify the entity.
- ProbeType - Type of entity from which data is being collected - VMWare, SMIS, NetApp, Amazon ECS, Bridge Sensors One or more .zip file as identified in the list of files
The configuration zip file contains one or more files which can be of two types:
• Snapshot
• Mini-snapshot
Snapshot
The snapshot type file contains the entire configuration about the data source to which the probe is connected. The name of this file is: <Site Name>_<DataSource>_snapshot_<YYYYMMDD>_<HHMMSS>_<Version>.txt, where:
- < Site Name>: Identifier for location (actual physical site) where the probe is situated
- <Data Source>: Identifier for the data source (resource, i.e., host, disk array, printer, etc.) from which the data is being collected
- <YYYYMMDD>_<HHMMSS>: The date and time when the snapshot was made
- <Version>: Version of the file.

The file format of snapshot is as follows:

```
%meta
    probe_id:<Identifier>
    probe_type:<Probe Type>
    probe_site:<Site Name>
    probe_server:<Server Name>
    probe_version:<Probe Version>
%meta
{
t:<YYYMMDD_HHMMSS>
{
R:<ResourceType>#<Resource Id>
O:{<ResourceType>#<Another_Resource_id>,}+?
b: <Begin Time YYYMMDD_HHMMSS >?
e:<End Time YYYMMDD_HHMMSS >?
a:{<Attribute Id>=<Attribute Value>}+
r:{<Resource Type>#<Resource Id>,}+
$:{<Event Id> <space><Event String>}+
}+
}+
```

Example

```
%meta
probe_id:Cust_192.168.0.63
probe_type:VMWare
probe_site:Cust1
probe_server:192.168.0.63
probe_version:10
%meta
t:20110624_062248
R:dc#Cust_192.168.0.63_datacenter-2
a:name=MTNVIEW
R:ds#Cust_192.168.0.63_datastore-205
a:name=FAS960_home
a:capacity=51322806272
a:freeSpace=42685091840
a:uncommitted=17323200512
a:provisionedSpace=25960914944
a:type=NFS
a:URL=netfs:||192.168.0.50||vol|vol0|home|
a:sioc=disabled
r:h#Cust1_192.168.0.63_host-171,
R:ds#Cust1_192.168.0.63_datastore-10
a:name=Storage1
$:AlarmSnmpCompleted Alarm 'Host error'- an SNMP trap
  for entity 192.168.0.48 was sent
```

Updates

As configuration changes and configuration related events occur, they will be written to a mini snapshot file. The name of this file will be: <Site name>_<Data Source>_minisnapshot_<YYYYMMDD>_<HHMMSS>_<version>.txt
<YYYYMMDD>_<HHMMSS>:

The format of this file is exactly same as the snapshot file. The primary difference is that it will have only have a subset of the data of the snapshot type of file. The subset captures the changes which have occurred in configuration data since the last time a snapshot file was made.

Performance Data

The performance data is a zip file which must have the following directory structure:
 <YYMMDD_HHMMSS>—This directory name the start time of the time series specified in this data set
  <Resource Type>—One directory for each resource type
   <Attribute Id>.txt—One file for each performance metric Each <Attribute Id>.txt has one or more lines where each line has the following format:

<Resource Signature> ',' {Value} ',' {',' <Value>} +

The value list is a time ordered series of values for that performance metric for the resource specified at the beginning of the time. If the metric value does not exist for a particular point in time, then a blank or empty value is allowed.

NRDB File System Structure

The performance metric data is stored in a filesystem structure as defined below. One directory is created for each day in the format YYYYMMDD. All performance data for all the resources in the data model for a particular day are stored in this directory. Under this directory, there is a directory for each resource where the directory name is the signature of that resource. Under this directory, there is one file for a group of attributes. The directory will look something like this:

```
<YYYYMMDD>   - One Folder for each day
    <Resource Type>
        <AttributeGroupId>.perf
```

<YYMMDD_HHMMSS>—This directory name contains the start time of the time series specified in this data set
 <Resource Type>—One directory for each resource type
  <Attribute Id>.txt—One file for each performance metric <AttributeGroupId>.perf file stores processed values for each sample in a compressed format. This format is now described in detail.

The file is divided into "n" number of sections. Where "n" is the attributes which are defined to be in the same group. Each section will hold "m" number of values—the entire time series values of that day for that resource's attribute. So, for example, if the probe sampling interval is 1 minute then there will be 1440 (1440 minutes in a day) values. Each <Attribute Id>.txt has one or more lines where each line has the following format:

<Resource Signature> ',' {Value} ',' {',' <Value>} +

The value list is a time ordered series of values for that performance metric for the resource specified at the beginning of the time. If the metric value does not exist for a particular point in time, then a blank or empty value is allowed.

Currently, corresponding to each raw value of a performance metric attribute received from the probe, two types of processed value are stored:

Band value
 An attribute can define the "fidelity" with which it will store the raw value. This is called in Band Factor. Band factor is an integer with a minimum value of 1 and maximum of any positive integer value. With a band factor of 1, there is no loss of fidelity. The processed value is same as raw value. With a band factor 10, the processed value will be 1/10th of the raw value rounded to the nearest integer.

Delta value
 It is the change in percentage from band value at time t−1 and band value at time t.

Each set of 1440 values of a performance metric attribute (assuming one value is measured every minute) are stored as a Java UTF-8 encoded String. Each performance metric attribute value is encoded as a single Unicode character in the String.

FIG. 2 is an example of a directory structure storing one day's performance data on a resource the performance of which is being monitored remotely. The processor 104 in FIG. 1 is programmed by instructions stored in main memory 106, according to one embodiment of the invention, to create a special directory structure with one directory for each day's worth of data, and one subdirectory for each resource for which performance metric data is being received. In FIG. 2, block 150 represents the directory created for storing the performance metric data collected on Aug. 14, 2011. The subdirectory represented by block 152 represents the subdirectory where performance data for the resource E1 is to be stored. Suppose in this example, that resource E1 is the server 130 in FIG. 1.

Each subdirectory has the directory name in its signature. In this case, subdirectory 152 has 20110814 in its directory name which is the name of the directory of which it is a part.

Each subdirectory contains one attribute file for each group of attributes that are being measured by the performance metric data that stores performance metric values. Each attribute file has N sections, one section for each attribute defined to be in the group for which the file was created. Each section holds M performance metric values for the particular attribute whose values are recorded in that section. That section's data comprises the entire time series of values for the attribute to which the section is devoted.

In the example of FIG. 2, there are only two groups of attributes in subdirectory 152 so there are only two files 154 and 156. Suppose each of these files represents one of the virtual machines running on server 130. Each file is a time slice of performance metric data values that records the entire day's worth of a metric in the section of that file devoted to storing values for that performance metric. Typically, if a metric has a measured value every minute, the section of the file devoted to that metric will have 140 comma delimited values for that metric encoded as a Java UTF-8 encoded string. UTF-8 is a multibyte character encoding for Unicode. UTF-8 can represent every character in the Unicode character set. Each of the 1,112,064 code points in the Unicode character set is encoded in a UTF-8 string comprised of one to four 8-bit bytes termed octets. The earlier characters in the Unicode character set are encoded using fewer bytes leading to greater efficiency. The first 128 Unicode character set coincide with the 128 ASCII characters.

The system of the invention has a mapping table that maps performance metric values into Unicode characters and then encodes them with UTF-8. Since Unicode only supports positive values, the Unicode range is split and a first range of Unicode values is mapped to positive performance metric values and a second range of Unicode values is mapped to negative performance metric values.

Each performance metric value from a measurement is encoded as a single Unicode character in the hexadecimal number system (hex).

Each new day's worth of data from all resources and all probes is stored in a new directory structure. The names of the directories, subdirectories and files include information about the day during which the data was gathered, the resources from which it was gathered and the particular group of attributes whose performance metric data is stored in the various sections of the file.

In the example of FIG. 2, the directory structure 150 has files 154 and 156 for one day of metric data gathered every minute for two different metrics from the same resource, represented by subdirectory 152. In other words, there is only one resource being monitored. Also, for the example of FIG. 2, there is only one attribute in each group of attributes and only two attributes total have performance metric data gathered. The performance metric data is gathered on Aug. 14, 2011 so the directory 150 created to store that day's metric data is named 20110814. There is only one resource being monitored called E1 so there is created a subdirectory 152 called 20110814_E1. That subdirectory contains two files. The first file 154 is named E1/G1, and it stores the metric values for metric 1 in group 1 (which has only one section because there is only one metric M1 in the group E1/G1). The values of metric M1 are gathered every minute and are symbolized as values V1 through V1440 which are stored as a comma delimited list. The value V1 is the value of metric M1 taken at time 00:01:01 on 8/14/2011, i.e., the first minute of 8/14/2011. The value V2 is the value of metric M1 taken at time 00:02:01 on 8/14/2011, the second minute of 8/14/2011. The value V1440 is the value of metric M1 taken at time 23:59:01 which is the last minute of 8/14/2011. Therefore, the position of any particular value on the comma delimited list denotes the time at which the value was captured on 8/14/2011.

The second file 156 in the resource E1 subdirectory is named E1/G2 and it stores values for a metric M2 in group 2 (which also only has one metric in the group so there is only one section in the file). It has not been shown in detail since it has the same structure as the file E1/G1.

The values stored in each position of the file are Unicode encoded meaning the numeric value of the metric's value has been mapped to a text character or string of characters in the encoding process.

This allows these values to be searched using regular expressions which are a form of formal language (used in the sense computer scientists use the term "formal language") which has predefined rules of syntax and semantics (together called its grammar). The elements from which regular expressions can be formed are known and each element has its own known syntax for how it is structure and has its own unique and known semantics defining what it means. Persons wishing to analyze the performance metric data in any way, can compose a regular expression using the available elements for composing a regular expression and their syntax and semantics.

FIG. 3 is another example of a file system containing a separate directory for storing performance metric data for three different days for three different resources, each resource having two groups of attributes. The file system storing metric data is represented by block 158. Three days of performance data are stored in directories 160, 162 and 164, respectively. Each of these directories has three subdirectories named R1, R2 and R3, each of which is a folder which contains actual files of text data encoding performance metric values that have been measured and transmitted by the agents. Blocks 166 and 168 represent comma delimited text files named GRP1.TXT and GRP2.TXT storing the performance metric data gathered on Jul. 27, 2011 for resource 1 for group 1 and group 2 attributes, respectively.

The reason for grouping different attributes performance values in the same file is for speed of loading and analysis. Typically, an analysis of a resource will involve looking at patterns or values or value changes of several different attributes over a particular interval. If the attributes involved in the analysis are all grouped in the same group, they will be stored in the same file. In this way, all the data needed to do the analysis can be loaded into memory for analysis simply by reading appropriate file containing the attribute group for the resource under analysis from the directory structure corresponding to the day of interest. That file is loaded into memory by a standard file access call to the operating system, and the regular expression search or searches can be performed on the data. This is faster than having to load several different files or having to do SQL queries to a database which would require a larger number of reads.

Figure 5:
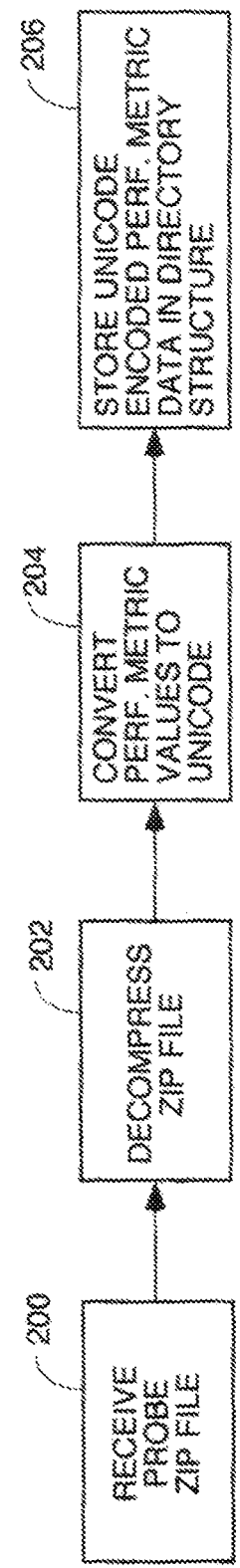
FIG. 5 is a flowchart of the high level process the monitoring server performs to receive probe data and stored it in the directory structure for search and analysis.

FIG. 5 is a high level flowchart of the process the monitoring server performs to receive the zip files of performance metric data from a probe, recover the data and store it. Block 200 represents the process of receiving the zip file of performance metric data from the probe. Block 202 represents the process of decompressing the zip file to recover the data structure such as that shown in FIG. 4. Block 204 represents the process of converting the numerical performance metric values stored in the text files to Unicode characters using a mapping table the server uses for such purposes. Block 206 represents the process of storing the Unicode data structure derived in step 204 in the appropriate parts of the NDRB data structure. Usually this just entails storing the entire directory and all its files on disk since the data structure is already structured as one directory for the particular day on which the data was collected with individual text files of metric data for each element being monitored in subdirectories for the type of element each text file represents.

Example of how a Regular Expression can be Used to Analyze the Metric Performance Data Suppose an analyst wanted to know if CPU utilization was between 90% and 100% for at least 5 minutes or more. The regular expression syntax to make a search and analysis of the performance metric data for CPU utilization would be in generic syntax:

[U90–U100]{5,} –100 –200

To convert this regular syntax to take into account the Unicode encoding of the CPU utilization metric values, suppose a CPU utilization metric value representing 90% utilization is mapped to Unicode hex character a, 92.5% CPU utilization is mapped to Unicode hex character b, 95% to hex character c, 97.5% to hex character d, and 100% to hex character e. If CPU utilization metric values are measured every minute, then a regular expression to determine if the CPU utilization was between 90% and 100% for at least 5 minutes would be:

[a-e]{5} which means if five consecutive values in the file storing CPU utilization values for the CPU in question on the day in question were any combination of hex characters a through e, then the expression evaluates to true. This means that every time on that particular day the CPU utilization metric values had five consecutive values which were any combination of hex a through hex e, then for each of those intervals, the CPU utilization was between 90% and 100%. This may mean the CPU is maxing out and another CPU should be added.

The preferred embodiment of the invention, the user must know the syntax of regular expressions in order to compose his or her query. In alternative embodiments, a user interface is provided which allows the user to think in the problem space and compose his queries in plain English, and the system converts that query into the proper syntax for a regular expression which will perform that query and analysis. In some embodiments, the software portion of the system of the invention presents a user interface which has a set of predefined searches which the user can use to do various forms of analysis. Each predefined search, when selected causes a regular expression to be generated and used to search the performance metric data and return the results. In some embodiments, these predefined searches are templates which have variables that can be set by the user. For example, there may be a predefined search to determine if CPU utilization is between x % and y % for more than z minutes where x, y and z are variables that the user can set before the search is run.

To run a search/query, in the preferred embodiment, the software of the system of the invention displays a query expression box and two time range boxes, one for a start time and one for an end time. These start and end time boxes are calendars in the preferred embodiment, and the user simply picks the first day for which data is to be examined and picks a second day in the end time calendar which is the last day of data to be examined. He then types his query into the query expression box in the syntax of the regular expression and hit return. The software then automatically accesses the appropriate directory structures for the day or days specified by the user, accesses the appropriate files that contain the performance metric attribute values as specified in the query expression, reads those attribute values into memory and examines the data using the logic specified in the query expression.

FIG. 6 is a template for a regular expression used to explain the syntax of a typical regular expression query. The h at the beginning of the regular expression indicates that this particular query is designed to search host performance metric data. If the query was about disks or something else, something indicative of the type of resource in question would be in the place of the h.

The large left bracket indicates the beginning of the actual query expression. The @ symbol at the beginning of the query expression is a keyword. The "CPU usage" term is the name of the attribute data to be searched and it is this attribute name which causes the software to look up the correct file name which contains the performance metric data for CPU usage. The "rx" term indicates that what follows is a regular expression, and the "b" term indicates that the type of search is for band data as opposed to delta data. The [U90–U100]{5} is a regular expression that indicates the actual criteria to be used in performing the band data search, i.e., it defines which performance metric data satisfy the query and which do not. The regular expression could also be a pointer to another regular expression stored in a file. The pointer would contain a unique ID for the regular expression to be used.

The band values are computed or mapped values for internal representation of numbers which are greater than the highest number which can be Unicoded (around 1,000,000). For example, if a data transfer rate is 20 million bits per second and the metric is 20,000,000, a band value will be computed for that metric using a reduction factor of, for example 10 million so as to reduce the 20 million number to the number 2 before it is Unicoded. Any reduction factor that brings the range of a performance metric which is a high number down into the Unicode range may be used for internal representation purposes. The searches are then done on the computed band values and not the actual performance metric numbers.

Delta values are useful for analyzing performance metric data that spikes. A delta value records how much a value has changed since the previous time it was measured.

The system, in the preferred embodiment, calculates and stores both a band value and a delta value for some or all performance metrics.

Query Definition Language
Objectives
    Be able to traverse from a set of resources to another set of related resources and so on
        At each stage of traversal apply certain filtering criteria:
            Configuration attributes: Matching certain value, change in value
            Relations: Addition or deletion of a relation
            Performance metrics: Matching certain patterns
Basic Syntax Building Blocks that May be Used to Build a Query
XPath style data processing/filtering and this processing will be applied to various search queries.
<Resource Type>/<*Related resource type>[= <conf attrId> rx <regex> ORIAND . . . ][~<conf attr id>, , , ][@<perf attr id> <rx bld>lrxId <regex or regex pattern id>][$<event id , , , ][+|–<related resource type]/{Related resource type/ . . . }{Related resource type/ . . . }
Relation Traversal:
<resource type>/<related resource type>/ . . .
Ex: v/h/d
The above expression will result the following path:
v→h→d
Multiple Traversal Paths:
<resource type>/{related resource type>/ . . . }{another related type>/ . . . }
Ex: v/{h/n}{r/d}
The above expression results to the following traversals:
    v/h/n (v→h→n)
    v/r/d (v→r→d)
Note: There is no limit on number or sub paths or any level of nested paths are supported as shown in the following sample:
v/{h/{r/d}{n}{r/d}
    The above sample results:
    v/h/r/d
    v/h/n
    v/r/d
Look for Changes in Configuration:
<resource type>[~ <attr id>, <attr id>, , ,]
Ex: v/h[~attr1,attr2]/n
It takes all resources of type 'v', finds the related resources of type 'h' which have configuration attributes attr1 and atttr2 have changes in the given time window. Then it finds resources of type 'n' which are related to the resulting resources of type 'h'.
Find Patterns in Performance Data:
<resource type>[@*<attr id> <rx bld> lrxId <expression or id>][@ . . . ]
<resource type>[@*#tw1#<attr Id> rx bld <expr . . . >]/<r type>[@^tw1^
<attr id><rx bl d> . . . ]
<resource type>[@*#tw1#<attr Id> rx bld <expr . . . >]/<r type>[@#tw2#^tw1^ <attr id><rx bld> . . . ]
Where
*: ignores the resulted data 1) can be used to derive time windows for subsequent use 2) can be used to build logical pattern
b: for banded data d: for delta values
Special note: Any numeric value in actual regex (exclusion=>quantifiers) should be prefix with "U" e.g [40-90] {5} will become [U40–U90]{5}. Here numbers within the character class have been modified but not the quantifier i.e {5}.

Examples of Regular Expression Queries of Various Types

Examples v[@attr1 rx b U90+]/h
It finds all the virtual machines which have performance data of metric attr1 value equal or exceeds 90 in the given time window. Then it finds the respective hosts. It also returns the matched performance data
v[@attr1 rxld rxp1]/h
It is similar to the example 2 but it specifies the regex pattern id which will be defined in a separate file.
v[@#tw1# attr1 rx b U90+]/h[@^tw1^ attr12 rx b U80+]
The first metric has defined a time span Id (tw1) which can be referred by any other metric in the subsequent path. If metric attr1 has generated any matched data and the respective time windows will be assigned the id "tw1" and the same time windows will be used on metric attr2. Note that if the connected host has narrow time windows than the resulted tw1, the common slots will be used on metric attr2.
Event Filter:
Syntax: [$*t:<regex pattern>,d:<regex pattern>]
Where
*: ignores the resulted data (won't produce any output but can be used to build logical patterns) t: will search against the type of the event d: will search against the description of the event
The following are valid:

| | |
|---|---|
| • [$t:rmAdded] | // type check |
| • [$d:error] | // description check |
| • [$t:rmAdded,d:error] | // logical OR |
| • [$*t:rmAdded] | // type check and ignore the result |
| • [$*d:error] | // description check and ignore the result |
| • [$*t:rmAdded,d:error] | // local OR and ignore the result |

Resource Addition/Deletion:
<resource type>[+ <related resource types added>, , , ][– <related resource types removed>, , ,]
Ex: v[+h,d,n][–h,d]
The above expression will return resources of type 'v' on which relation of type 'h', 'd', 'n' has added or relation of type 'h', 'd' has been removed.
How to exclude the data of a matched relation:
<resource type>/*<related resource>/<sub resource>
Ex: v/*h/d
The above express will return resources of type 'v' and the related resources of type 'd' directly. But, it will skip the data of the matched resources of type 'h' in the output.
Note: One can mix any of the above combinations. One can specify configuration changes, performance data filters, events list, multiple paths, etc. in the same query.
Logical AND Operator
Logical AND operations are supported at path level and filter level.
At Path Level:

Syntax: P1/[&]P2/[&]P3/P4....
Example 1: p1/&p2    à p1 && p2Note: p1 qualifies only if p2 qualifies
Example 2: p1/&p2/&p3    à p1 && p2 && p3Note: p2 is dependent on p3 and p1 is dependent on p2
Example 3: p1/p2/&p3    à p1, p2 && p3Note: p1 can qualify irrespective of p2 status but p2 can qualify only if p3 qualifies
Example 4: p1/&p2/p3/&p4    à p1&&p2, p3&&p4Note: p2 can qualify irrespective of p3 status At Filter Level:
Syntax: P1[filter1][&][filter 2][&][filter 3]/P2[filter 1][&][filter 2] . . .
Example 1: p1[=1001 rx Demo3]&[@2001 rx b U10+]P1 qualifies if both the filters find matches

| | |
|---|---|
| Example 2: p[f1][f2]&[f3] | à (f1 ‖ f2) && f3 |
| Example 3: p[f1]&[f2][&f3] | à f1 && f2 && f3 |
| Example 4: p[f1][f2][f3] | à f1 ‖ f2 ‖ f3 |
| Example 5: p[f1]&[f2][f3] | à f1 && (f2 ‖ f3) |

Note: if f1 fails, it exits (no processing of f2 or f3). Short circuit execution on Logical AND failure. But if f1 succeeds, it processes both f2 and f3 irrespective of their resultsConsider "‖" for union rather than logical OR.
Example 6: p[f1]&&&&[f2] à f1 && f2Note: multiple &s will be collapsed into one
Example 7: p[f1][f2]& à f1 ‖ f2Note: trailing & will be ignored
Others
Regular expression patterns can include brackets, but only with matching pairs.
When a resource is included in the higher level path, it will not be repeated in lower level paths.

Example v[=attr1 rx Demo3]/*h/v
In third level in the result, Demo3 will not be repeated.
*v[=attr1 rx Demo3]/*h/v
Since in first level Demo3 is not included, it will appear in the third level
Regex Patterns
Query supports both regular expression string or regular expression pattern id which will be defined in a separate file in the following format:

```
<PatternList>    <Pattern id=" "
extraDataPoints=""><![CDATA[<pattern>]]></Pattern></PatternList>
Example
<PatternList>       <Pattern id="rxp1" extraDataPoints="30">
   <![CDATA[9+]]>   </Pattern></PatternList>
```

Pattern with id "rxp2" will directly apply the regular expression pattern to the performance data.
ExtraDataPoints will be used in the result set to return additional data in addition to the matched values. It adds 30 points before and after to the matched values.
Query Processing Flow
The configuration data tells the system what types of resources have performance metric data stored in the system and what are the attributes of each type of resource, some of said attributes which may have had performance data measured. The configuration data basically tells what resources have existed for what periods of time.
FIG. 7 is a flowchart of the processing of the query processor. When the query processor starts, it first reads the query to determine the start and end times of the interval of performance data to be searched, and then reads a configuration data file to determine for the time frame of the query (as set by the user by setting the start date and end date for the query expression) what resources exist or have existed. These processes are represented by step 210. If a resource or resources existed for only part of the relevant query interval, the query processor determines from the configuration data the valid times these resources existed during the relevant interval, and, if the resources still exist, at what time they came into existence during the relevant query interval. Resources can come and go such as when a server is taken offline or a disk is swapped out. Reading the query and the configuration data file and determining what resources existed at any time during the relevant interval is symbolized by step 210. The configuration file also contains data which tells which resources are related to the resources named in the query. For example, a disk which is contained in or connected to a particular server is indicated as related to that server.

The server reads all this data in the configuration file and, in step 212, creates a map of only the relevant resources, i.e., the resources of the system that match the resource type identified at 208 in the query of FIG. 6 and which existed at any time during the query interval and any related resources. In the preferred embodiment, the string at 208 identifies only a resource type. In this example of FIG. 6, the resource type is a host. This results in all the performance data for all resources of that type being loaded into memory as described below for the entire day or days which include the relevant interval starting at the start time and ending at the end time identified in query. These start and end times are given by the user in separate boxes (not shown) from the query expression box when the user enters the query expression of FIG. 6 by interacting with a display on a computer that shows the query box and start and end time boxes.

This filtering out of performance data for resources not of the named type allows the query processor to easily and quickly find performance metric data which has been stored in the NDRB for only the relevant resource types indicated at 208 in the query syntax of FIG. 6.

The query processor then starts parsing the query expression and determines from element 213 of the query of FIG. 6 what type of attribute data for the resource type named at 208 which is stored in the NDRB and which the query processor needs to perform the query. In the example of the query of FIG. 6, parsing the query and reading portion 213 thereof, the query processor determines it will be performing a search on performance metric data for CPU usage on all hosts as identified by the string at 208. This is symbolized by step 214 of FIG. 7.

Also in step 214, the query processor examines the start time (date and time) and end time (date and time) set by the user on the query screen (not shown). The query processor then goes to the NDRB and examines the directory structures and finds the directory structures for the relevant day or days that contain the start time and end time of the query. The query processor then determines which subdirectory or subdirectories in these relevant directories which contain performance metric data for resources of the type indicated at 208 in FIG. 6. The query processor then determines the text files in the relevant subdirectories and determines which text files contain the performance metric data for the group of attributes which contain the attribute identified in the query expression, i.e., the attribute identified at 213. The query processor also determines from the configuration data file what other resources are related to the resource types identified at 208 and loads the performance metric data for these related resources for the relevant interval into memory also, which is also part of step 214 in some embodiments.

Next, in step 216, the query processor determines whether the needed data is already stored in cache. If so, the needed data is loaded from the cache memory to save the time of a disk read. If the needed data is not stored in the cache, the query processor sends a read request to the operating system API to read the appropriate text file or files containing the data needed for the query into memory in step 218. Step 218 loads the entire day's worth of performance data for the resources of the type identified in the string at 208 in FIG. 6 and for the group of attributes including the attribute identified at 213 of the query expression.

Now all the performance metric data for the file containing the performance metric data for the entire group of attributes that contain the relevant attribute, and for the entire day or days spanning the start date and end date are stored in memory. The data in memory contains both performance metric data for attributes not named in the query as well as performance metric data for the relevant attribute which is outside the start time and end time given in the query. To eliminate this excess data, the query process builds a new string containing only the data for the relevant attribute and only starting at the starting time and ending at the ending time named in the query. This process is symbolized by step 220. To do this, the query processor finds the row in the loaded file which contains the performance metric data for the relevant attribute identified at 213 of the relevant resource identified at 208 and counts entries until it reaches the value recorded for the named start time. That performance metric value and all subsequent values extending out to the end time are copied to a new file in the same sequence they were stored in the NDRB, all as symbolized by step 220.

In step 222, the logic of the regular expression shown at 221 is applied to the performance data in the new file created in step 220 to find values which meet the criteria expressed in the regular expression at 221 of the search query for every resource of the type identified at step 208. The values so found are returned and decoded from Unicode back to the original performance metric values received from the probe. If multiple substrings from multiple resources of the type indicated at 208 are found which match the query, all such matching substrings are returned along with identifying data as to which resource returned each string. In some embodiments including the preferred embodiment, the metadata about the resource identity (the specific host identity in the example of FIG. 6), the attribute identity (CPU usage in the example of FIG. 6), as well as the start time and end time of the query and the times the returned values were recorded is also returned for help in analyzing the results. In some embodiments, only a true or false result is returned. In some embodiments, if a true result is returned, and the sub string of performance metric values which matched the regular expression is also returned after being decoded from Unicode back to the performance metric value received from the probe.

Nested Queries

Sometimes complex situations arise where trouble shooting of the performance metric data is needed to solve a problem. An example would be where a host is running multiple virtual machines and one of them has slowed down considerably or stopped responding and the reason why needs to be determined. In such a case, a set of nested queries such as those given below can be used to determine the source of the problem.

vm[@readlatency rx b [U20–U1000] {5}/h[@readlatency rx b [U20–U1000]{5}/vm[@readiop rx b [U1000–U2000]{5}]

The above query is actually three nested queries designed to drill down into the performance data to find out what the problem is with a slow virtual machine.

The first part of the query is: vm[@readlatency rx b [U20–U1000] {5}/This query looks at the readlatency attribute (a measure of speed) of all virtual machines which is between U20 and U1000 for 5 consecutive readings. This range U20–U1000 finds all the virtual machines which are running pretty slow.

The question then becomes why are these virtual machines running slowly. To find that out, one question would be are the hosts that are executing the code of the virtual machines themselves running slowly for some reason. In parsing this query, the query processor determines all host type resources which are related to the virtual machine type identified by the string vm at the beginning of the query. The performance metric data for all these hosts is loaded into memory when the virtual machine performance metric data is loaded into memory according to the processing of FIG. 7. In order to find out if the host or hosts are running slowly, the second part of the query is used. That part is:

h[@readlatency rx b [U20–U1000]{5}/

This second part of the query looks at all the readlatency performance metric values for host type resources that are related to the virtual machine resource type identified in the first part of the query and determines which ones of these hosts are running slowly. The returned data indicates which hosts have slow read latency. The question then becomes why is this host or hosts running slowly. To answer that, the third part of the query is used. That part determines which virtual machines which are related to the hosts have high 10 operations going on which are bogging down the hosts. The third part of the query is:

vm[@readiop rx b [V1000–V2000]{5}]

This query returns the identities of the virtual machine which have high levels of input/output operations going on. This high level of I/O operation will bog down the hardware of the host and will be the explanation why other virtual machines have slowed down or stopped. The results can then be used to shut down the virtual machine that is bogging down the system or modify its operations somehow so as to not slow down the other virtual machines.

The results returned, for example, might indicate that virtual machine 1 on host 1 is running slowly and host 1 is running slowly because virtual machine 3 on that host is running a high number of I/O operations. Another set of data that matches the three queries may show also that virtual machine 2 running on host 2 is running slowly because host 2 is running slowly because virtual machine 4 running on host 2 is carrying out a high number of I/O operations.

Module Processing Flows

Figure 8A:
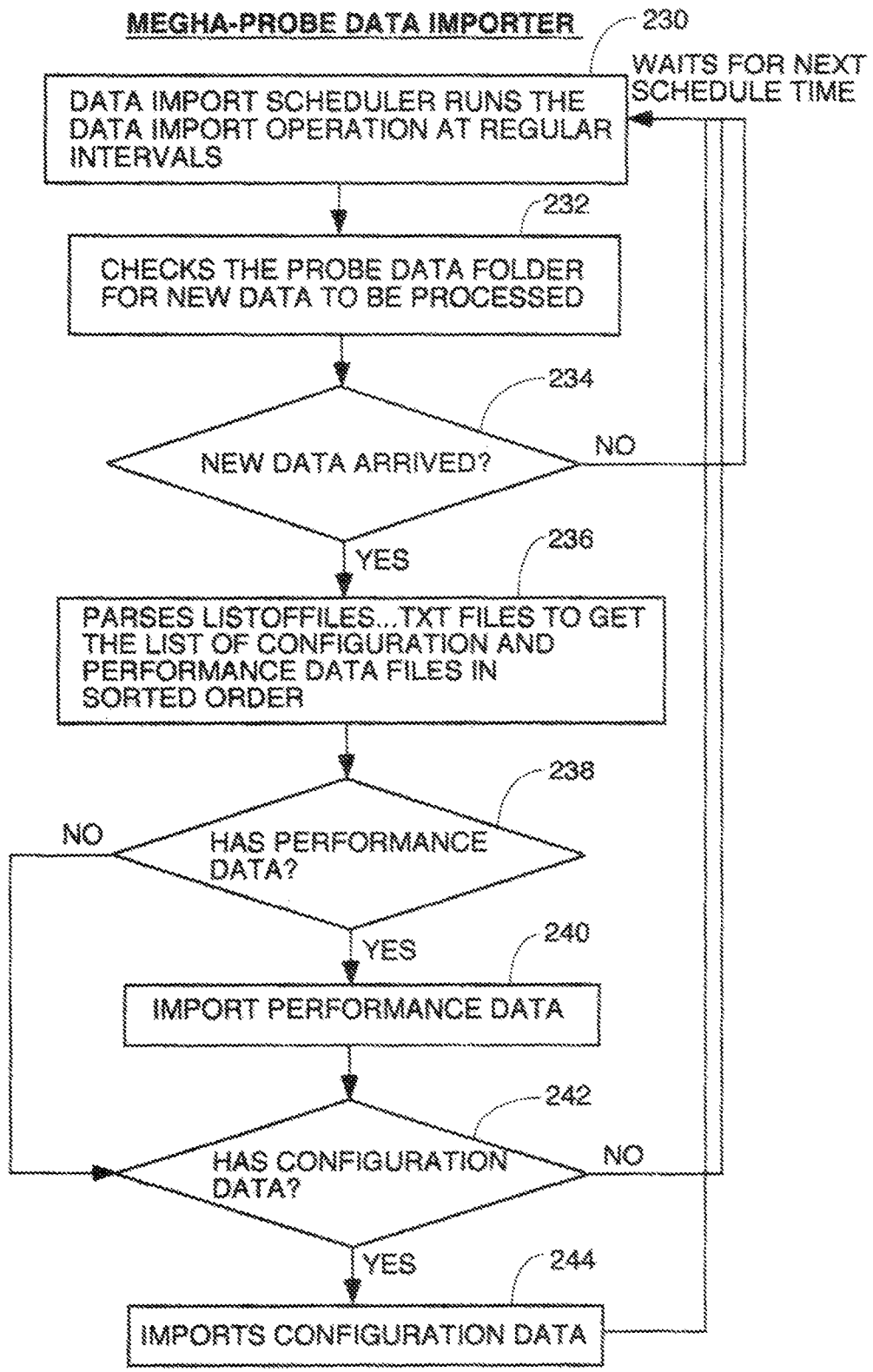
FIG. 8, comprised of FIGS. 8A through 8C, is a flowchart of the processing of the probe data importer.
Figure 8B:
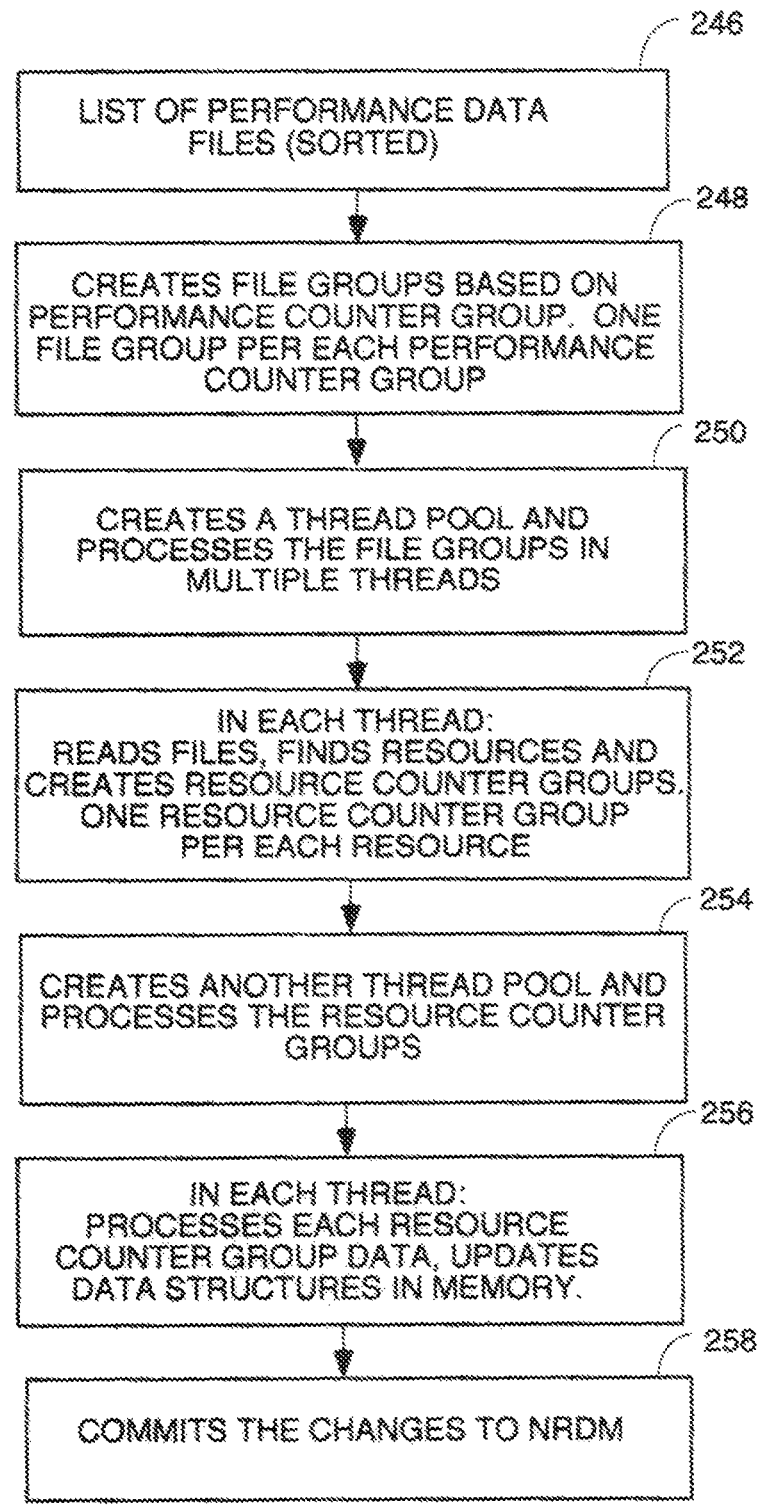
Figure 8C:
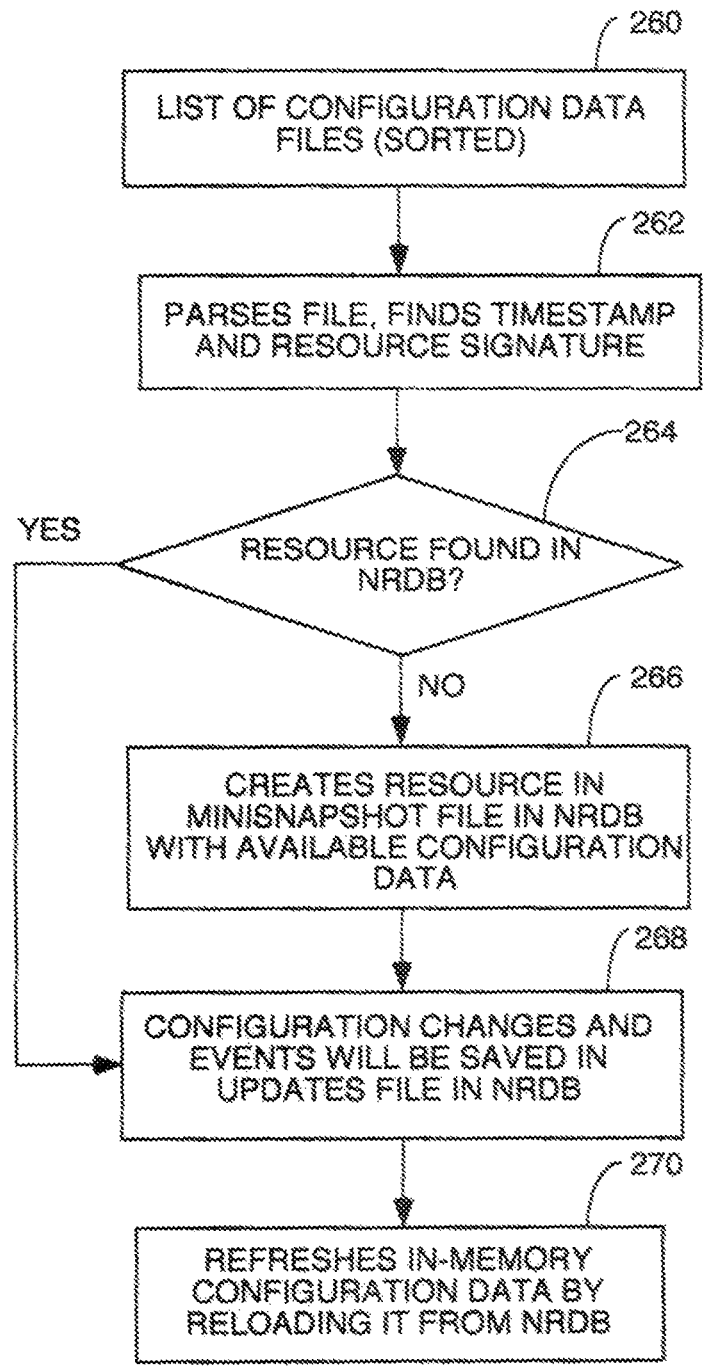

FIG. 8, comprised of FIGS. 8A through 8C, is a flowchart of the processing of the probe data importer. The Probe Data Importer runs a Data Import Scheduler routine which runs data import operations at regular intervals, as symbolized by step 230. Step 232 checks the probe data folder for new data to be processed. Test 234 determines if new data has arrived, and, if not, processing returns to step 230. If new data has arrived, step 236 is performed to parse the list of files to get the list of configuration and performance metric data files in the new data in sorted order. Test 238 determines if the new data has performance metric data in it. If so, step 240 is performed to import the performance data. If the new data does not have performance data files in it, processing skips from step 238 to step 242 where a test is performed to determine if configuration data has arrived. If not, processing returns to step 230 to wait for the next data import. If new configuration data has arrived, step 244 is performed to import the new configuration data.

Step 246 starts the processing of performance metric data files listed in the sorted list. Related performance counters of each resource will be grouped together for storage and access optimization. Step 248 creates file groups based on performance counter group wherein one file group is formed for each performance counter group. Step 250 creates a thread pool and processes the file groups in multiple threads. Using Java API (java.util.concurrent package), it creates a pool of threads and each thread will pick one FileGroup at a time and processes it. After completion of one FileGroup processing, the same thread will pick the next FileGroup, if any, for processing and the process repeats until all the FileGroups are processed. Total thread count in the thread pool is configured through application properties file. Step 252 is the processing for each thread. In each thread, the files are read and the resources identified in the files are found and resource counter groups are created. There is one resource counter group per each resource. In step 254, another thread pool is formed, and the resource counter groups are processed as explained above. In step 256, for each thread, the resource counter group data is processed, and data structures in memory are updated to reflect the collected performance metric data for each resource. The resource counters are used to determine where in each text file each performance metric data value is to be stored to properly reflect the time at which it was gathered. Finally, in step 258, the data structures created in memory, i.e., the text files created when the performance metric values are converted to Unicode and stored in text files per the structure described elsewhere herein, are written to non volatile storage of the NRDB.

Step 260 on FIG. 8C represents the start of processing of the configuration files listed on the sorted list. In step 262, the configuration data file is parsed and the timestamp and resource signature is found. Test 264 determines whether the resource identified by the resource signature is found in the NRDB. If not, step 266 creates a minisnapshot file in the NRDB using the available configuration data. If test 264 determines that the resource identified in the configuration file is already in the NRDB, step 268 is jumped to where the configuration changes and events are saved in an updates file in the NRDB. Finally, in step 270, the in-memory configuration data is refreshed by re-loading it from the NRDB.

Figure 9A:
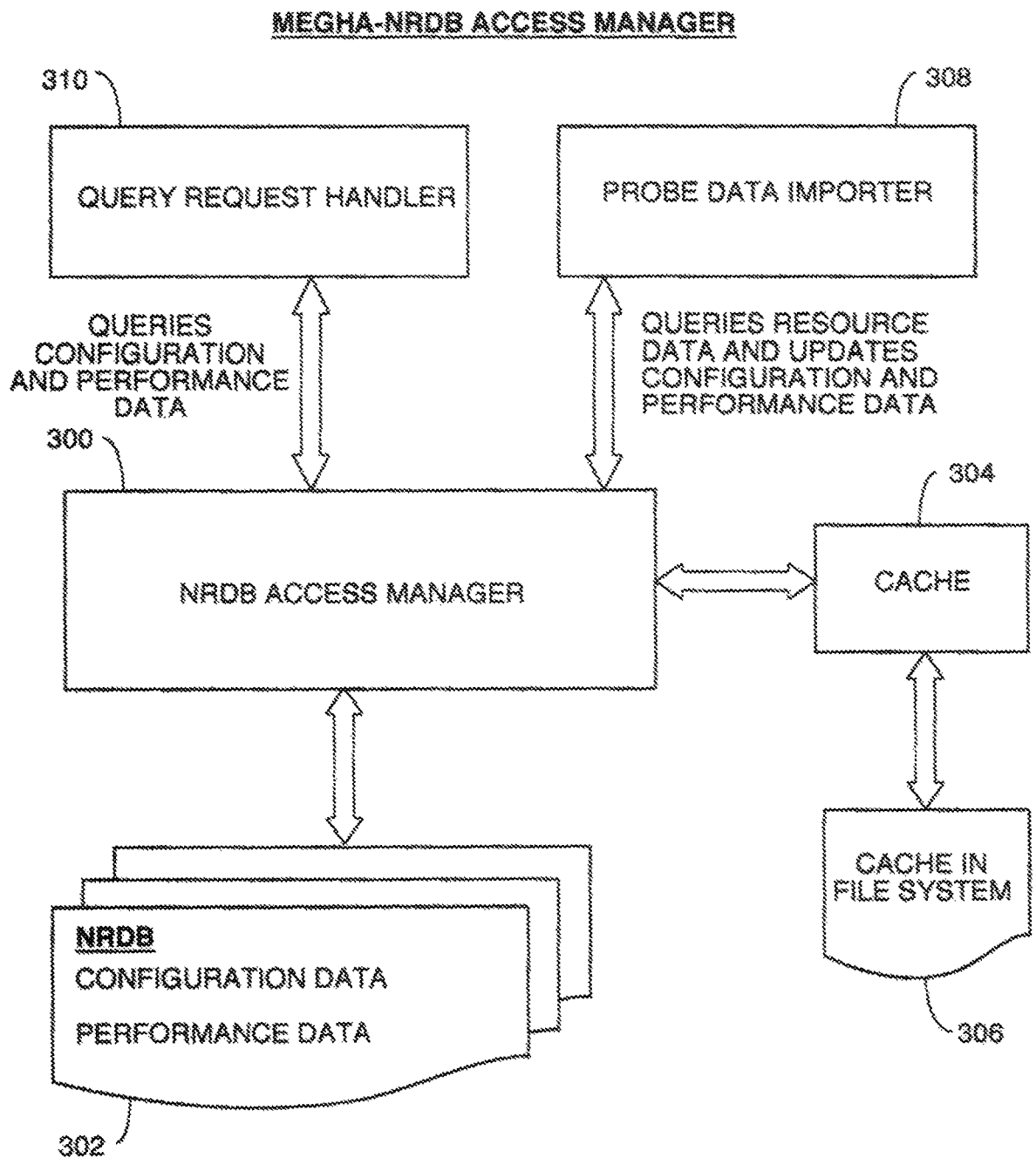
FIG. 9, comprised of FIGS. 9A and 9B, is a diagram of the modules in the system and a flowchart of the processing of the NRDB Access manager module.
Figure 9B:
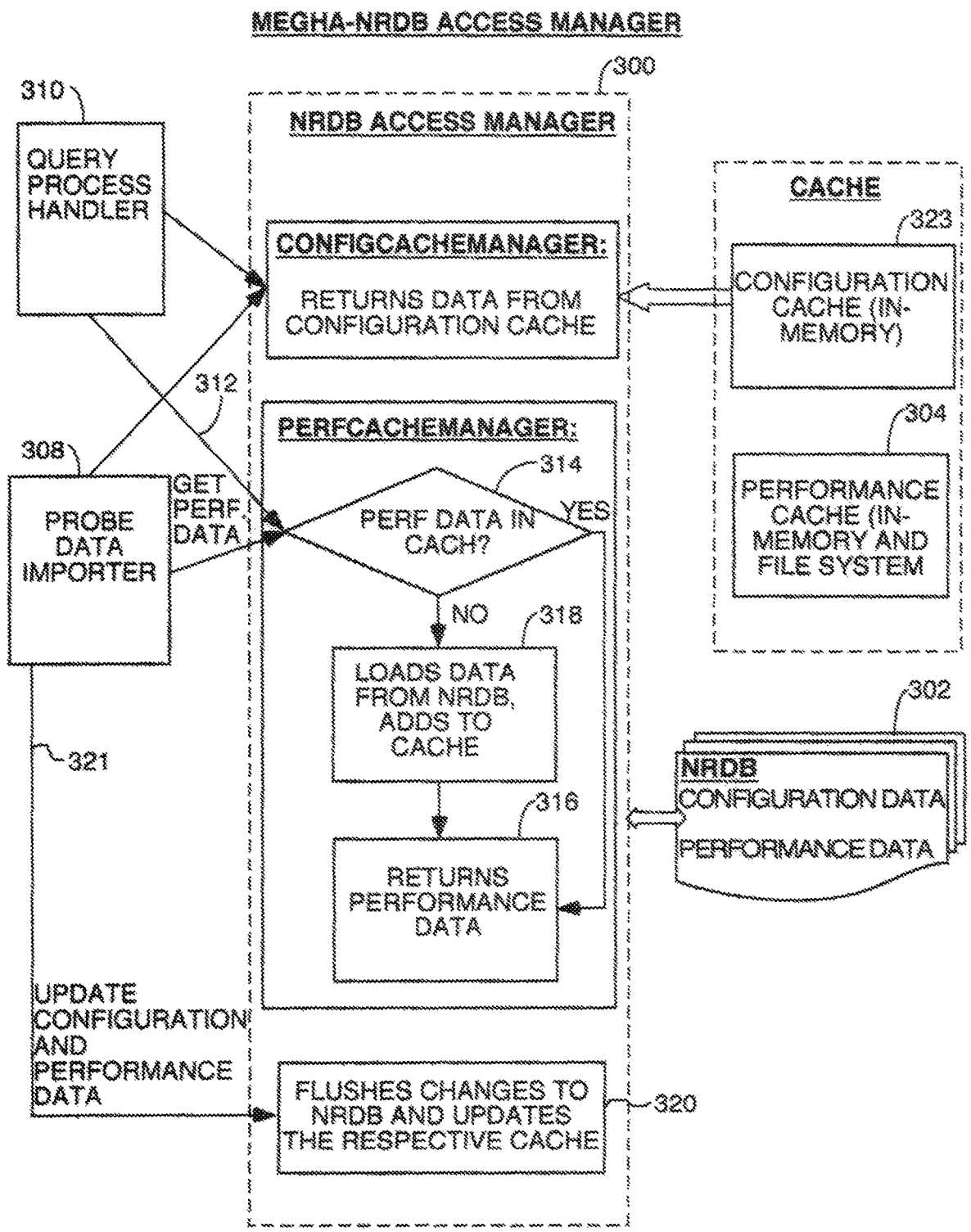

FIG. 9, comprised of FIGS. 9A and 9B, is a module diagram and flowchart of the processing of the NRDB Access manager module. The NRDB access manager module 300 controls access to the non relational data base file system 302 where the configuration data and performance metric data is stored. The NRDB access manager module 300 retrieves data from the NRDB and uses a cache 304 in memory of the server which is running module 300 and a cache 306 in the file system to store data which is frequently accessed to speed up data access. Performance data and configuration data are imported from the probes by the Probe Data Importer module 308 by the processing previously described and put into the NRDB via the NRDB access manage module 300. Query requests to analyze the performance metric data in the NRDB are handled by Query Request Handler module 310 which accesses the data in the NRDB via the NRDB Access Manager module 300.

In FIG. 9B, the NRDB Access Manager processing starts with receiving a request for performance metric data from the Query Process Handler, this request symbolized by line 312. Step 314 determines if the requested performance data is in the performance data cache 304 in the system RAM and in the file system. If it is, step 316 is jumped to, and the performance data is returned from the cache to the Query Process Handler 310. If test 314 determines the performance data requested is not in the cache, step 318 is performed to load the requested data from the NRDB file system into the cache 304, and then step 316 returns the requested data to the Query Process Handler 310.

The Probe Data Importer 308 adds updated and new configuration data and new performance data via data path 321 to the NRDB through step 320, and updates the respective configuration data cache 323 in RAM or the performance data cache 304 in RAM and in the NRDB file system itself. NRDB Access Manager before processing performance metric data gets the in-memory representation (Java object) of the performance metric data through Performance cache. Performance cache first verifies in memory whether it is already loaded from the file. If not, it loads the data from the file for the given date. If data is not available, it creates a file with template data (default values) for all the sampling intervals for that day. Based on the start time, it updates the in-memory performance metric data at appropriate locations. Once all the metrics data in the group is processed, it commits the changes back to the file. The data will be compressed (deflate format) before saved into the file.

Figure 10:
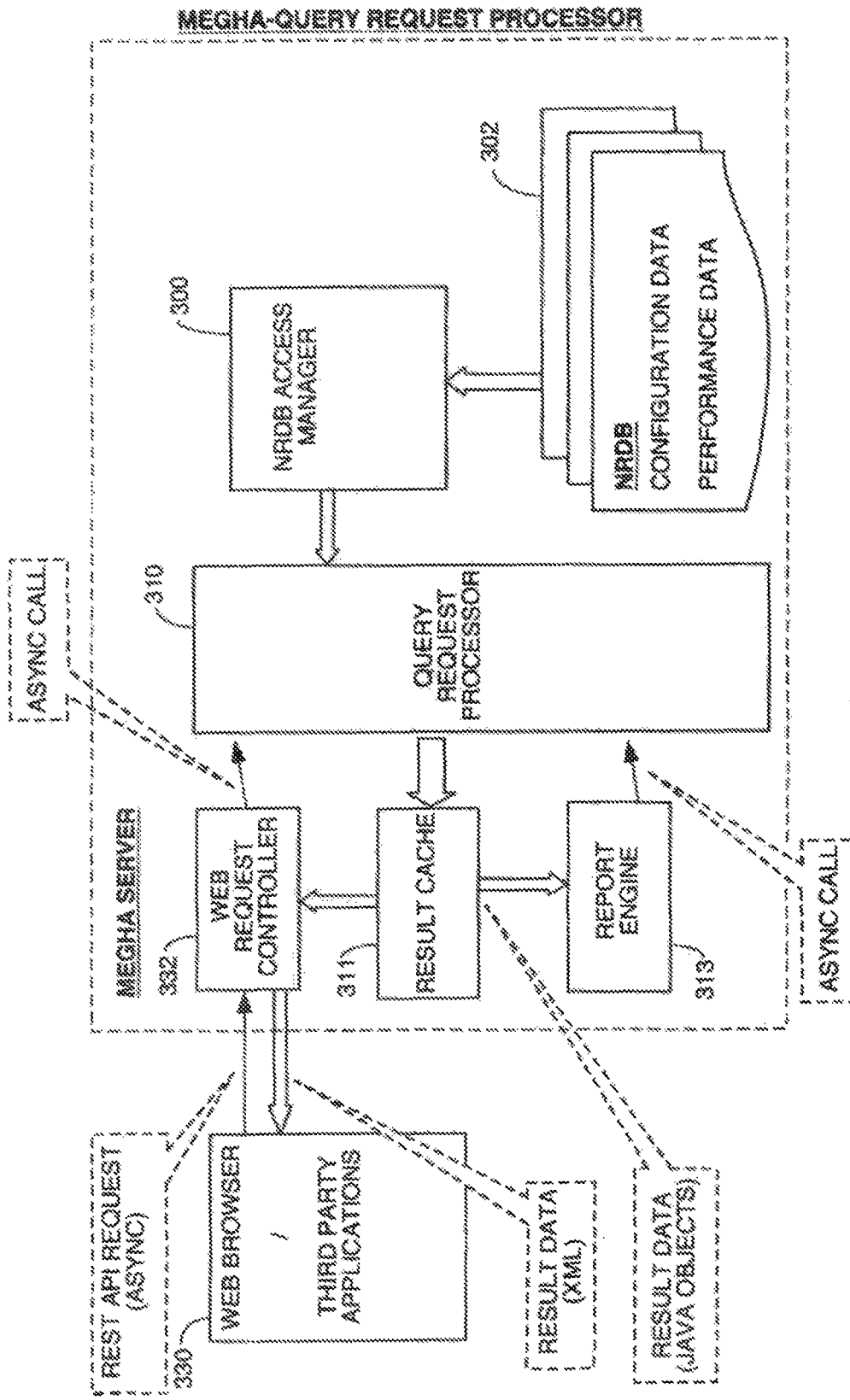
FIG. 10 is a block diagram of one embodiment of the overall system including the major functional modules in the central server called Megha, where the query request processing for analysis of performance metric data occurs and where the NDRB stores the performance metric data and configuration data.

FIG. 10 is a block diagram of one embodiment of the overall system including the major functional modules in the central server called Megha™, where the query request processing for analysis of performance metric data occurs and where the NDRB stores the performance metric data and configuration data. Persons who want to query the performance metric data send an asynchronous request using a web browser running on a client computer 330 to a Web Request Controller 332 running on the Megha server using a REST application programmatic interface (API). The Web Request Controller 332 receives the request, validates it and then forwards it to the Query Request Processor module 310 with an asynchronous Java API call. Then the Web Request Controller returns the status to the client computer 330 by hinting that the client needs to come back for the result. The Query Request Processor 310 processes the request and incrementally saves the results in a Results Cache 311. The client computer 330 then sends back a request for the results to the Web Request Controller 332 which checks the Results Cache 311. The results are then returned by the Web Request Controller 332 to the client 330 in an XML format if available. If the Query Request Processor is still processing the request, the Web Request Controller send the status hint to the client indicating it needs to send another request for the results later. The Report Engine 313 is a Java class object which sends query requests to the Query Request Processor 310 Java API invocation asynchronously and reads the results data from the Result Cache 311 through a Java API.

Figure 11:
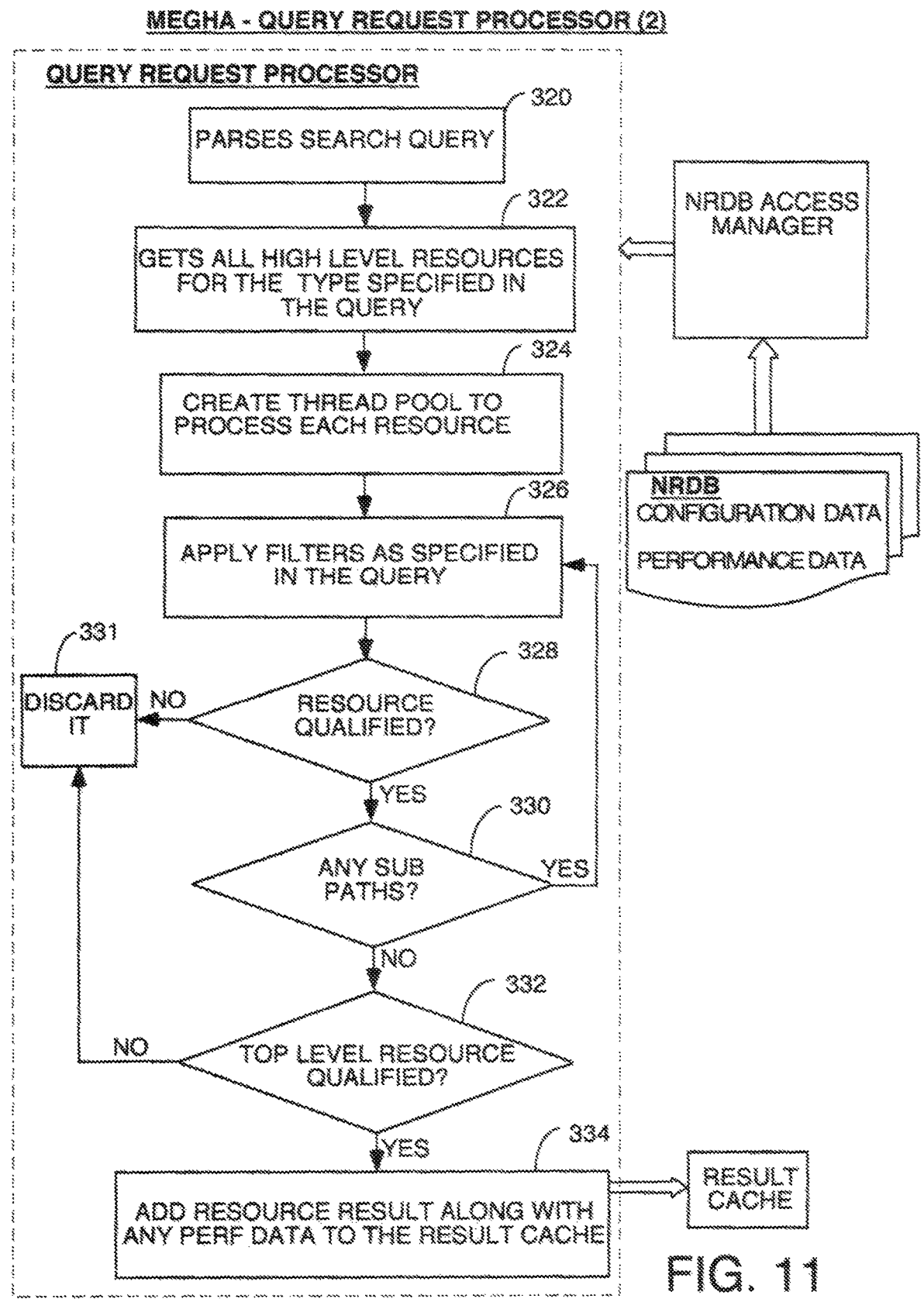
FIG. 11 is a flowchart of the processing by one embodiment of the Query Request Processor.

FIG. 11 is a flowchart of the processing by one embodiment of the Query Request Processor. Step 320 parses the search query. If the search query has an invalid format, the result cache is updated with an error and processing is terminated. Each query starts with a high level resource type. The Query Request Processor reads the resource type and responds by making a request in step 322 for all the performance metric data in the NRDB for all resources of the type specified in the query. That request is made through the NRDB Access Manager. In step 324, a thread pool is created to process the data from each resource of the type identified in the query. Each thread processes data from one of the resources of the type identified in the query. The number of threads created is configured in the application properties file.

In step 326, any filters specified in the query are applied. Filters can be things like configuration attribute matches, events, performance data patterns, etc. All the specified filters are applied in sequential order. For example, the following query vm[=name rx exchangevm1][$t:Network adapter added] [@usedCapacity rx b u40+]

has one configuration attribute match filter, an event filter and one performance data pattern match filter specified.

After applying the filters, if a thread finds that a resource's performance metric data meets the criteria specified in the query in test 328, then test 330 is performed. If test 328 determines that the performance metric data of a resource does not meet the criteria in a query, step 331 is performed to discard the performance metric data. In step 330, the query is examined to determine if there is a sub path to a sub resource specified therein. If there is a sub path specified, the performance metric data of the sub path sub resource is loaded from the NRDB. Then any specified filters are applied again in step 326 to determine if the sub resource qualifies, i.e., the performance metric data of the sub resource meets the specified criteria in the query. This process continues until all sub paths specified in the query to sub resources have been processed. When there are no more sub paths, or, if there were no sub paths specified in the first place, test 332 is performed to determine if the top level resource qualified, and, if not, the data is discarded in step 331. If the top level resource does qualify, the resource that qualified along with any performance data that met the criteria specified in the query are added to the Result Cache in step 334.

Those skilled in the art will appreciate alternative embodiments that do not depart from the spirit and scope of the above described embodiments. All such alternative embodiments are intended to be included within the scope of the claims appended hereto.

The invention claimed is:

1. A process for searching, comprising:
receiving performance metric data gathered from each attribute of each resource type and converting each performance metric data number to a Unicode character and storing said Unicode characters in a flat file of a non relational data base file system;
using a computer programmed to receive a search query comprised of syntax blocks and a start time and a stop time to receive a user set start time and a user set stop time and a search query comprising:
a first syntax block symbolizing a first resource type;
a second syntax block indicating addition of a related resource type following a pair of ninth syntax blocks;
a third syntax block symbolizing said related resource type to be added to said first resource type;
a pair of fourth syntax blocks enclosing said second syntax blocks and third syntax blocks;
a fifth syntax block following said first syntax block indicating a performance attribute search;
a sixth syntax block indicating the type of performance attribute of said first resource type to search for;
a seventh syntax block indicating what follows is a regular expression;
an eighth syntax block following said seventh syntax block indicating a value of said performance attribute sought for in the search;
a pair of said ninth syntax blocks enclosing said fifth through eighth syntax blocks;
using a computer to run said search and return all instances of the first resource type where said related resource type was added.

2. The process of claim 1 wherein said search query includes a eleventh set of syntax block following said eighth syntax block indicating the performance attribute of said first resource type must be found exactly the number of times indicated in said eighth syntax block, or at least the number of times indicated in said eighth syntax block;
and wherein said computer runs said search and returns all instances where said first resource type and said attribute thereof is found the number of time indicated in said eighth syntax block where said related resource type was added;
and wherein the process of storing said Unicode characters in a flat file of a non relational database comprises:
storing all Unicode characters gathered on the same day in one top level directory having a name from which the date of the day and the start time of the Unicode characters can be derived;
storing all the Unicode data derived from performance attributes of one resource type in one subdirectory having information in the name from which the name of the top level directory and the identification of the individual resource type to which the directory is devoted can be derived;
storing all the Unicode data derived from one performance attribute of said one resource type in one section of one file in the subdirectory devoted to the resource type and giving the file the name of the identification for the performance attribute group;
each performance attribute is stored in one section of said file, the number of sections in the file equal to the number of attributes in a related group of attributes; and
each performance attribute file sections having one or more lines, each line having the resource signature of the performance attribute devoted to said line, and one or more values in a value list, each value being one of a time-ordered series of values.

3. The process of claim 1 where the process of storing said Unicode characters in a flat file of a non relational database comprises:
storing all Unicode characters gathered on the same day in one top level directory having a name from which the date of the day and the start time of the Unicode characters can be derived;
storing all the Unicode data derived from performance attributes of one resource type in one subdirectory having information in the name from which the name of the top level directory and the identification of the resource to which the directory is devoted can be derived;
storing all the Unicode data derived from one performance attribute of said one resource in one file in the subdirectory devoted to the resource and giving the file a name from which the name of the performance attribute can be derived; and
each performance attribute file having one or more lines, each line having the resource signature and one or more values in a value list, each value being one of a time-ordered series of values.

4. The process of claim 1 further comprising:
receiving a configuration data file containing configuration data regarding at least the resource types involved in the search and the servers said resource types are running on, and unpacking the configuration data;
storing the unpacked configuration data in a separate location in said non relational database file system; and
wherein said searching step comprises consulting said configuration data with the start times and stop times of search to determine whether said first resource type and said related resource type existed during the relevant interval defined by the interval between said start time and said stop time, and then searching for instance of said first resource type which has had said related resource type added during said relevant interval, and outputting each instance of said first resource type which has had said related resource added.

5. A process for searching, comprising:

receiving performance metric data gathered from each attribute of each resource type and converting each performance metric data number to a Unicode character and storing said Unicode characters in a flat file of a non relational data base file system;

using a computer programmed to receive a search query comprised of syntax blocks and a start time and a stop time to receive a user set start time and a user set stop time and a search query comprising:
  a first syntax block symbolizing a first resource type;
  a second syntax block indicating a performance attribute of said first resource type;
  a third syntax block symbolizing a resource type related to said first resource type;
  a fourth syntax block indicating deletion of said related resource type;
  fifth syntax blocks enclosing said related resource type and said fourth syntax block indicating deletion;
  sixth syntax blocks enclosing said performance attribute of said first resource type;
  a seventh syntax blocks indicating said first resource type and said first resource type performance attribute must be found a number of times equal to the seventh syntax block, or must be found at least the number of times equal the seventh syntax block, or that said first resource type and said its performance attribute must be found at least between X times and Y times;

using a computer to run said search and return all instances of the first resource type and said its performance attribute which were found the numbers of times indicated in said seventh syntax block and where said related resource type was deleted.

6. The process of claim 5 where the process of storing said Unicode characters in a flat file of a non relational database comprises:

storing all Unicode characters gathered on the same day in one top level directory having a name from which the date of the day and the start time of the Unicode characters can be derived;

storing all the Unicode data derived from performance attributes of one resource in one subdirectory having information in the name from which the name of the top level directory and the identification of the individual resource to which the directory is devoted can be derived;

storing all the Unicode data derived from one performance attribute of said one resource in one section of one file in the subdirectory devoted to the resource and giving the file a name from which the name of the group of performance attribute can be derived;

each different performance attribute is stored in one section of said file, with the number of sections in the file equal to the number of performance attributes in the group; and each performance attribute file sections having one or more lines, each line having the resource signature of the performance attribute devoted to it, and one or more values in a value list, each value being one of a time-ordered series of values such that, with the time duration between collection times known for that performance attribute, the time of collection of each value is derived;

and further comprising the process of deriving configuration data from one or more resource types and storing said configuration data in a different location of said non relational database than in which said Unicode is stored.

7. The process of claim 5 where the process of storing said Unicode characters in a flat file of a non relational database comprises:

storing all Unicode characters gathered on the same day in one top level directory having a name from which the date of the day and the start time of the Unicode characters can be derived;

storing all the Unicode data derived from performance attributes of one resource type in one subdirectory having information in the name from which the name of the top level directory and the identification of the individual resource type to which the directory is devoted can be derived;

storing all the Unicode data derived from one performance attribute of said one resource type in one file in the subdirectory devoted to the resource type; and each group of performance attributes file having one or more lines, with the number of lines corresponding to the number of performance attributes in a group of related performance attributes and the name of the file being the attribute group identification, each line having the resource signature and one or more values in a value list, each value being one of a time-ordered series of values such that, with the time duration between collection times known, the time of collection of each value is derived.

8. The process of claim 5 further comprising:

receiving a configuration data file containing configuration data regarding at least the resource types involved in the search and the servers said resource types are running on, and unpacking the configuration data;

storing the unpacked configuration data in a separate location in said non relational database file system; and wherein said searching step comprises consulting said configuration data with the start times and stop times of search to determine whether said first resource type and said related resource type existed during the relevant interval defined the interval between said start time and said stop time, and then searching for instance of said first resource type and said performance attribute have been found the number of time indicated by said seventh syntax block which has had said related resource type subtracted during said relevant interval, and outputting each instance of said first resource type and said its performance attribute which has had said related resource type subtracted therefrom.

9. A process for searching, comprising:

receiving performance metric data gathered from each attribute of each resource type and converting each performance metric data number to a Unicode character and storing said Unicode character in a flat file of non relational data base file system;

using a computer programmed to receive a search query comprised of syntax blocks and a start time and a stop time to receive a user set start time and a user set stop time and a search query comprising:

a first syntax block symbolizing a first resource type;
a second syntax block indicating a performance attribute of said first resource type;
a third syntax block indicating deletion of a second related resource type;
a fourth syntax block indicating addition of a third related resource type;
a fifth syntax block symbolizing a second resource type related to said first resource type;
a sixth syntax block symbolizing a third resource type related to said first resource type;
seventh syntax blocks enclosing said third related resource type and the syntax block indicating addition;
eighth syntax blocks enclosing said second related resource type and the syntax block indicating deletion;
ninth syntax block indicating said first resource type and said performance attribute must have been found X times, or at least X times, or between Y times and Z times;
using a computer to run said search and return all instances of the first resource type and said performance attribute which have been found the numbers of times indicated in said ninth syntax block and where said third related resource type was deleted or said second resource type was added.

10. The process of claim 9 where the process of storing said Unicode characters in a flat file of a non relational database comprises:
storing all Unicode characters gathered on the same day in one top level directory having a name from which the date of the day and the start time of the Unicode characters can be derived;
storing all the Unicode data derived from performance attributes of one resource type in one subdirectory having information in the name from which the name of the top level directory and the identification of the resource type to which the directory is devoted can be derived;
storing all the Unicode data derived from one performance attribute of said one resource type in one section of one file in the subdirectory devoted to the resource type and giving the file the name of the group of related performance attributes;
each performance attribute in one performance attribute group which are related stored in one section of said file, the number of sections in the file equal to the number of performance attributes in the group; and
each file section of the group of related performance attributes file having one or more lines, each line having the resource signature of the performance attribute whose Unicode data is stored therein, and one or more values in a value list, each value being one of a time-ordered series of values such that, with the time duration between collection times known for that performance attribute, the time of collection of each value is derived.

11. The process of claim 10 wherein:
said searching step comprises consulting said configuration data with the start times and stop times of search to determine whether said first resource type and said second and third related resource types existed during the relevant interval defined the interval between said start time and said stop time, and then searching for instances of said first resource type and said performance attribute having been found the number of times indicated in said ninth syntax block and which has had said second related resource type subtracted during said relevant interval or has had said third resource type added during said relevant interval, and outputting each instance of said first resource type and said first resource type performance attribute which has had said second related resource type subtracted therefrom or has had said third resource type added.

12. The process of claim 9 where the process of storing said Unicode characters in a flat file of a non relational database comprises:
storing all Unicode characters gathered on the same day in one top level directory having a name from which the date of the day and the start time of the Unicode characters can be derived;
storing all the Unicode data derived from all the performance attributes of one resource type in one subdirectory having information in the name from which the name of the top level directory and the identification of the resource type to which the directory is devoted can be derived;
storing all the Unicode data derived from one performance attribute of said one resource type in one file in the subdirectory devoted to the resource type and giving the file the name of the performance attribute group; and
each related performance attribute file having one or more lines, each line having the resource signature and one or more values in a value list, each value being one of a time-ordered series of values such that, with the time duration between collection times known, time of collection of each value is derived;
and further comprising the steps of receiving a compressed configuration data file containing configuration data regarding at least the resource types involved in the search and the servers said resource types are running on, and unpacking the configuration data;
storing the unpacked configuration data in a separate location in said non relational database file system.

* * * * *